(12) United States Patent
Phillips et al.

(10) Patent No.: US 8,245,669 B2
(45) Date of Patent: Aug. 21, 2012

(54) WATER HEATING SYSTEMS AND METHODS

(75) Inventors: Terry G. Phillips, Meridianville, AL (US); James Bullington, Athens, AL (US)

(73) Assignee: A. O. Smith Corporation, Milwaukee, WI (US)

(*) Notice: Subject to any disclaimer, the term of this patent is extended or adjusted under 35 U.S.C. 154(b) by 692 days.

(21) Appl. No.: 11/692,135

(22) Filed: Mar. 27, 2007

(65) Prior Publication Data
US 2007/0248143 A1 Oct. 25, 2007

Related U.S. Application Data

(60) Provisional application No. 60/786,326, filed on Mar. 27, 2006, provisional application No. 60/908,132, filed on Mar. 26, 2007.

(51) Int. Cl.
F22B 1/28 (2006.01)
(52) U.S. Cl. ........................ 122/4 A; 219/492
(58) Field of Classification Search ................ 122/4 A, 122/504; 219/409, 492
See application file for complete search history.

(56) References Cited

U.S. PATENT DOCUMENTS

| | | | |
|---|---|---|---|
| 2,575,150 A | 11/1951 | Wellman | |
| 2,686,031 A | 8/1954 | Bolesky | |
| 3,276,599 A | 10/1966 | Them | |
| 3,900,238 A | 8/1975 | Anderson | |
| 3,992,608 A | 11/1976 | Snavely | |
| 4,191,444 A | 3/1980 | Smith et al. | |
| 4,365,228 A | 12/1982 | Rowley | |
| 4,399,971 A | 8/1983 | Fehrmann et al. | |
| 4,421,269 A | 12/1983 | Ts'ao | |
| 4,511,790 A | 4/1985 | Kozak | |
| 4,620,667 A | 11/1986 | Vandermeyden et al. | |
| 4,641,223 A * | 2/1987 | McIntosh | 361/816 |
| 4,657,215 A | 4/1987 | Murphy | |
| 5,023,432 A | 6/1991 | Boykin et al. | |
| 5,056,712 A | 10/1991 | Enck | |
| 5,103,078 A | 4/1992 | Boykin et al. | |
| 5,297,272 A | 3/1994 | Lu et al. | |
| 5,321,827 A | 6/1994 | Lu et al. | |
| 5,324,213 A | 6/1994 | Frantz | |
| 5,410,726 A | 4/1995 | Baqai et al. | |
| 5,490,279 A | 2/1996 | Golbert et al. | |

(Continued)

FOREIGN PATENT DOCUMENTS
WO WO 03/044610 5/2003
(Continued)

OTHER PUBLICATIONS

United States Office Action for U.S. Appl. No. 11/201,665 dated Oct. 17, 2007 (13 pages).

(Continued)

*Primary Examiner* — Gregory A Wilson
(74) *Attorney, Agent, or Firm* — Michael Best & Friedrich LLP

(57) ABSTRACT

A water heating system, comprise a tank, a heating element, and a controller that is coupled to the heating element. The controller comprises a base, a housing, a relay, logic and, a temperature sensor. The base is composed of thermally conductive material, and the housing is composed of electrically insulating material. The housing is coupled to the base, and the logic is configured to control the a state of the relay. Further, the temperature sensor contacts the base and is coupled to the logic.

17 Claims, 24 Drawing Sheets

U.S. PATENT DOCUMENTS

| | | | |
|---|---|---|---|
| 5,530,620 | A | 6/1996 | Sangveraphunsiri |
| 5,643,000 | A | 7/1997 | Dent |
| 5,761,518 | A | 6/1998 | Boehling et al. |
| 5,897,396 | A | 4/1999 | Maejima |
| 5,910,643 | A | 6/1999 | Laine et al. |
| 5,968,393 | A * | 10/1999 | Demaline ............... 219/492 |
| 5,988,516 | A | 11/1999 | Gilmour |
| 6,082,894 | A * | 7/2000 | Batko et al. ............. 374/142 |
| 6,216,956 | B1 | 4/2001 | Ehlers et al. |
| 6,265,699 | B1 | 7/2001 | Scott |
| 6,292,859 | B1 | 9/2001 | Santiago |
| 6,293,471 | B1 | 9/2001 | Stettin et al. |
| 6,308,009 | B1 | 10/2001 | Shellenberger et al. |
| 6,350,967 | B1 * | 2/2002 | Scott ....................... 219/497 |
| 6,375,087 | B1 | 4/2002 | Day et al. |
| 6,389,226 | B1 | 5/2002 | Neale et al. |
| RE37,745 | E | 6/2002 | Brandt et al. |
| 6,520,122 | B2 | 2/2003 | Kemp et al. |
| 6,633,726 | B2 | 10/2003 | Bradenbaugh |
| 6,795,644 | B2 | 9/2004 | Bradenbaugh |
| 6,860,432 | B2 | 3/2005 | Conover et al. |
| 6,869,313 | B2 | 3/2005 | Gibboney |
| 6,988,182 | B2 | 1/2006 | Teachman et al. |
| 6,989,514 | B2 | 1/2006 | Patterson et al. |
| 7,002,531 | B2 * | 2/2006 | Koike ........................ 345/3.1 |
| 7,037,139 | B1 | 5/2006 | Stefaniu et al. |
| 7,065,431 | B2 | 6/2006 | Patterson et al. |
| 7,099,572 | B2 | 8/2006 | Phillips |
| 7,117,825 | B2 | 10/2006 | Phillips |
| 7,307,495 | B2 | 12/2007 | McLauchlan et al. |
| 7,346,274 | B2 | 3/2008 | Bradenbaugh |
| 2002/0008101 | A1 | 1/2002 | Hauschulz |
| 2003/0091091 | A1 | 5/2003 | Patterson et al. |
| 2003/0093185 | A1 | 5/2003 | Patterson et al. |
| 2003/0093186 | A1 | 5/2003 | Patterson et al. |
| 2003/0219999 | A1 | 11/2003 | Minich et al. |
| 2004/0069768 | A1 | 4/2004 | Patterson et al. |
| 2004/0079749 | A1 | 4/2004 | Young et al. |
| 2004/0158361 | A1 | 8/2004 | Patterson et al. |
| 2004/0177817 | A1 | 9/2004 | Bradenbaugh |
| 2004/0225414 | A1 | 11/2004 | Patterson et al. |
| 2005/0043907 | A1 * | 2/2005 | Eckel et al. ................ 702/62 |
| 2005/0231318 | A1 * | 10/2005 | Bullington .................. 337/36 |
| 2005/0275993 | A1 | 12/2005 | Phillips |
| 2006/0047870 | A1 | 3/2006 | Phillips |
| 2006/0190141 | A1 | 8/2006 | Patterson et al. |
| 2006/0196206 | A1 | 9/2006 | Murray et al. |
| 2006/0257127 | A1 | 11/2006 | Patterson |
| 2007/0034169 | A1 | 2/2007 | Phillips |
| 2007/0183758 | A1 | 8/2007 | Bradenbaugh |
| 2007/0191994 | A1 | 8/2007 | Patterson et al. |
| 2007/0210067 | A1 | 9/2007 | Patterson et al. |
| 2007/0245980 | A1 | 10/2007 | Phillips |
| 2007/0246551 | A1 | 10/2007 | Phillips |
| 2007/0246552 | A1 | 10/2007 | Patterson |
| 2007/0246556 | A1 | 10/2007 | Patterson |
| 2007/0246557 | A1 | 10/2007 | Phillips |
| 2007/0248340 | A1 | 10/2007 | Phillips |
| 2008/0053699 | A1 | 3/2008 | Nakayama et al. |
| 2008/0293283 | A1 | 11/2008 | Tanaka et al. |
| 2009/0293816 | A1 | 12/2009 | Patterson |
| 2010/0082134 | A1 | 4/2010 | Phillips |

FOREIGN PATENT DOCUMENTS

| | | |
|---|---|---|
| WO | WO 2007/100318 | 9/2007 |

OTHER PUBLICATIONS

United States Office Action for U.S. Appl. No. 11/201,665 dated Mar. 17, 2008 (15 pages).

United States Office Action for U.S. Appl. No. 11/201,665 dated Aug. 6, 2008 (19 pages).

United States Office Action for U.S. Appl. No. 11/201,665 dated Jan. 14, 2009 (12 pages).

United States Office Action for U.S. Appl. No. 11/432,103 dated Oct. 6, 2008 (9 pages).

United States Office Action for U.S. Appl. No. 11/692,117 dated Sep. 11, 2009 (22 pages).

United States Office Action for U.S. Appl. No. 11/692,130 dated Jun. 19, 2009 (9 pages).

United States Office Action for U.S. Appl. No. 11/692,152 dated May 27, 2009 (7 pages).

United States Patent Office Advisory Action for U.S. Appl. No. 11/692,117 dated May 17, 2010 (3 pages).

United States Patent Office Action for U.S. Appl. No. 11/692,117 dated Mar. 5, 2010 (26 pages).

United States Patent Office Action for U.S. Appl. No. 12/611,233 dated Oct. 18, 2010 (16 pages).

United States Patent Office Action for U.S. Appl. No. 11/692,117 dated Aug. 25, 2010 (35 pages).

United States Patent Office Action for U.S. Appl. No. 11/692,178 dated Jun. 22, 2010 (12 pages).

United States Patent Office Action for U.S. Appl. No. 11/692,179 dated Jun. 22, 2010 (16 pages).

United States Patent Office Action for U.S. Appl. No. 11/692,182 dated Oct. 5, 2010 (10 pages).

United States Patent Office Examiner's Answer for U.S. Appl. No. 12/611,233 dated Oct. 19, 2011 (8 pages).

United States Patent Office Action for U.S. Appl. No. 12/536,628 dated Apr. 15, 2011 (8 pages).

United States Patent Office Action for U.S. Appl. No. 12/611,233 dated Mar. 30, 2011 (17 pages).

United States Patent Office Action for U.S. Appl. No. 11/692,182 dated Mar. 25, 2011 (13 pages).

United States Patent Office Action for U.S. Appl. No. 11/692,179 dated May 23, 2011 (13 pages).

United States Patent Office Action for U.S. Appl. No. 12/611,233 dated Jun. 3, 2011 (4 pages).

United States Patent Office Action for U.S. Appl. No. 11/692,179 dated Jun. 21, 2011 (12 pages).

United States Patent Office Action for U.S. Appl. No. 12/611,233 dated Dec. 13, 2010 (4 pages).

United States Patent Office Action for U.S. Appl. No. 11/692,179 dated Dec. 6, 2010 (13 pages).

United States Patent Office Notice of Allowance for U.S. Appl. No. 12/536,628 dated Aug. 5, 2011 (2 pages).

United States Patent Office Action for U.S. Appl. No. 11/692,179 dated Mar. 29, 2012 (14 pages).

* cited by examiner

WATER HEATING SYSTEMS AND METHODS

CROSS REFERENCE TO RELATED APPLICATION

This application claims priority to U.S. Provisional Application No. 60/786,326, entitled "Water Heating System and Method," and filed on Mar. 27, 2006, which is incorporated herein by reference. This application also claims priority to U.S. Provisional Application No. 60/908,132, entitled "Water Heating Systems and Methods," and filed on Mar. 26, 2007, which is incorporated herein by reference.

RELATED ART

For many decades, water heater controllers have been mechanically actuated. In this regard, at least one temperature sensitive switch is typically mounted on a side of a water tank. Thermal stresses within the switch fluctuate as the temperature of the water within the tank changes. If the temperature of water within a region in close proximity to the switch falls below a threshold, referred to as a "lower set point," mechanical forces caused by thermal stresses in the switch actuate a mechanical component of the switch thereby allowing electrical current to flow to a heating element within the tank. Thus, the heating element begins to heat the water in the tank. Once the temperature of the water rises above a threshold, referred to as an "upper set point," mechanical forces caused by the thermal stresses actuate the mechanical component of the switch yet again thereby stopping current from flowing to the heating element. Thus, the heating element stops heating the water in the tank. Accordingly, the temperature of the water is kept within a desired range.

Recently, attempts have been made to migrate from mechanically actuated controllers to electronically actuated controllers. In this regard, rather than relying on a temperature sensitive switch that is actuated by mechanical force resulting from thermal stress, a temperature sensor, such as a thermistor, is used to measure water temperature and provide data indicative of the measured temperature. Electronic circuitry, which may include software as well as hardware, then analyzes the temperature data to determine when a heating element is to be activated. Although a relay, which is typically an electro-mechanical component, can be used to control whether current flows to the heating element and, therefore, whether the heating element is activated, the state of the relay and, therefore, the activation state of the heating element are controlled via an electrical signal rather than mechanical force induced by thermal stresses. In this sense, the controller and, in particular, the switch (e.g., relay) used to activate and deactivate the heating element are "electronically actuated."

Electronically actuated controllers enable water heating systems to be controlled via more complex algorithms. For example, it is possible for the controller to analyze a usage history of the water heating system and to automatically establish the set points based on time of day and the usage history. Thus, the set points can be set higher during expected periods of relative high use, and the set points can be set lower during expected periods of relative low use, thereby increasing the efficiency of the water heating system.

However, several problems have been encountered in the design and development of electronically actuated controllers, and many of the problems are heat related. In this regard, the temperature of the water in a water heating system is usually set significantly higher than 100 degrees Fahrenheit (F) and, in some cases, higher than 150 degrees F. Further, the electronics within an electronically actuated controller produce additional heat within the controller. Indeed, the relays used to control the activation states of the heating elements typically carry 20 to 30 Amperes (A) of a 120 or 240 Volt (V) alternating current (AC) signal and can, therefore, generate significant heat. Moreover, the temperatures within the controller can reach levels that affect the reliability of the controller's electronics.

In addition, as described above, an electronically actuated controller typically uses temperature data from a temperature sensor, such as a thermistor. For ease of installation and to help reduce manufacturing costs, it would be desirable for such a temperature sensor to be integral or embedded with the other electronics of the controller. However, the heat from the other electronics can affect the temperature readings of the temperature sensor, thereby affecting the reliability of the temperature measurements, if the temperature sensor is in close proximity to the other electronics.

To alleviate some of the heat related problems, the size of the controller can be increased. However, increasing the size of the controller is generally undesirable for several reasons, including increasing costs. In this regard, it is generally desirable for an electronically actuated controller to be similar in size to conventional, mechanically actuated controllers so that conventional water tanks do not need to be redesigned. Indeed, if an electronically actuated controller is about the same size as a conventional, mechanically actuated controller, then a conventional water tank that currently has a mechanically actuated controller can be retrofitted with an electronically actuated controller at a relatively low cost. Further, water tank manufacturers already have assembly lines in place that may need to be changed, at a relatively high cost, if the design of the water tank is changed to accommodate a larger controller that is electronically actuated.

Moreover, it is generally desirable for the size of an electronically actuated controller to be minimized and, in particular, to be at a size similar to or less than the size of conventional controllers that are mechanically actuated, but such a goal can be difficult to realize without a significant impact to reliability in view of the heat related problems described above.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views

DETAILED DESCRIPTION

Figure 1:
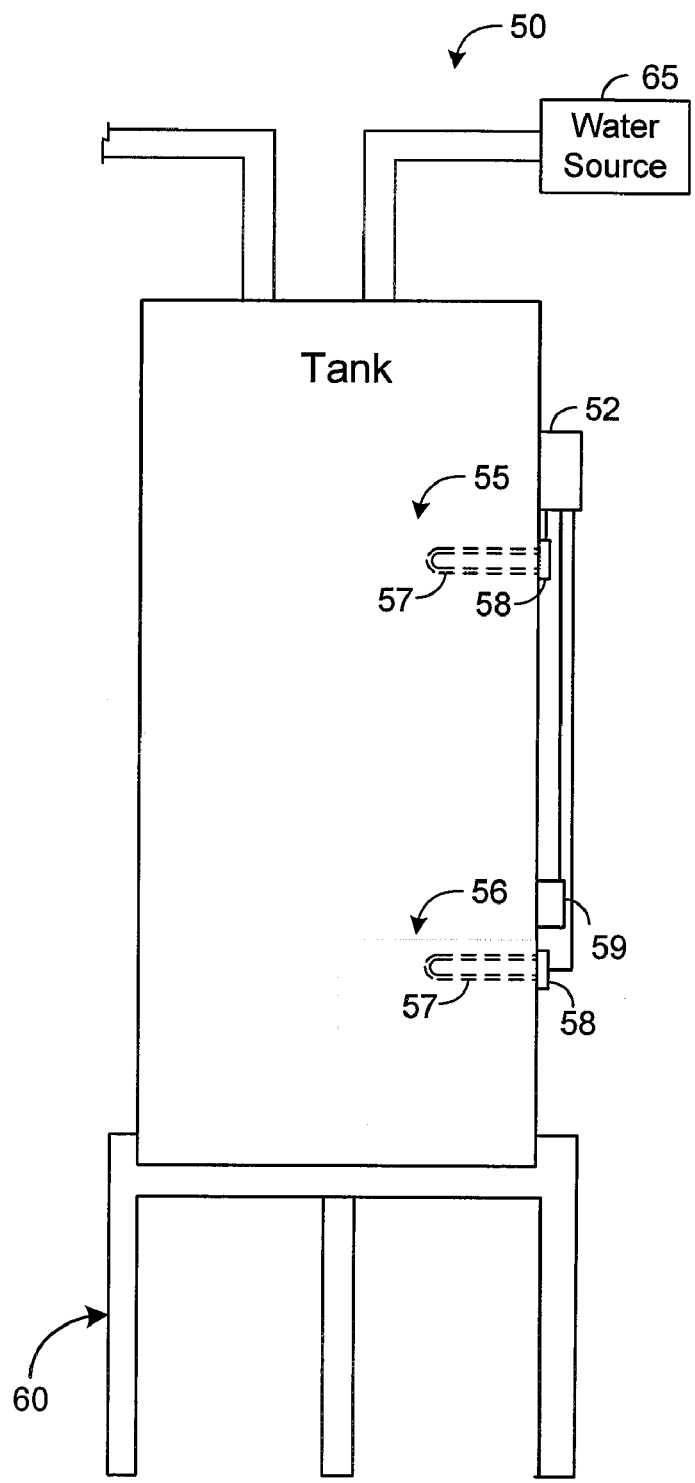
FIG. 1 is a block diagram illustrating an exemplary water heating system.

FIG. 1 depicts a water heating system 50 in accordance with an exemplary embodiment of the present disclosure. In this regard, FIG. 1 depicts an exemplary water heater controller 52 that is electronically actuated and is mounted on a side of a tank 53, although the water heater controller 52 may be positioned at other locations in other embodiments. The system 50 shown by FIG. 1 has two heating elements, referred to as "upper heating element 55" and "lower heating element 56." Each heating element 55 and 56 comprises an electrically resistive coil 57 that, when activated, emits heat to water or other fluid within the tank 53 and a base 58 that is mounted to a side of the tank 53. The coil 57 is located within the tank 53 and is submerged in the water held by the tank 53. Any known or future-developed heating element may be used to implement either of the heating elements 55 or 56. For many conventional heating elements, the base 58 is screwed into the tank 53 through a hole in the side of the tank 53.

The upper heating element 55 is mounted to an upper portion of the tank 53 above the lower heating element 56, which is mounted to a lower portion of the tank 53. However, other numbers and arrangements of heating elements are possible in other embodiments. Also mounted to a side of the tank 53 in FIG. 1 is a sensor holding apparatus 59, which will be described in more detail hereinbelow. As shown by FIG. 1, the tank 53 may be positioned on a stand 60, although such a stand 60 is unnecessary and may be removed from the system 50, if desired.

Cold water is drawn into the tank 53 via a pipe 63 coupled to a water source 65. Operating under the direction and control of the controller 52, the heating elements 55 and 56 heat the water within the tank 53, and heated water is drawn out of the tank via pipe 67. Various techniques may be used to control the heating provided by the elements 55 and 56. In one exemplary embodiment, the controller 52 has an embedded temperature sensor (e.g., a thermistor), although such a sensor 66 (FIG. 3) may be located elsewhere, such as mounted to a side of the tank 53, in other embodiments. In general, the controller 52 activates the upper heating element 55 to cause this element 55 to emit heat when the temperature sensed by the sensor 66 falls below a specified threshold, referred to as a "lower set point." After activating the upper heating element 55, the controller 52 keeps the element 55 in an activated state until the temperature sensed by the sensor 66 exceeds a threshold, referred to as an "upper set point." Once this occurs, the controller 52 deactivates the heating element 55 such that it stops heating the water within the tank 53. As such, the water in the upper portion of the tank 53 can be maintained in a desired temperature range.

In addition, the sensor holding apparatus 59 has an embedded temperature sensor (e.g., a thermistor), although such a sensor 68 (FIG. 3) may be located elsewhere in other embodiments. In general, the controller 52 activates the lower heating element 56 to cause this element 56 to emit heat when the temperature sensed by the sensor 68 falls below a specified threshold, referred to as a "lower set point." After activating the lower heating element 56, the controller 52 keeps the element 56 in an activated state until the temperature sensed by the sensor 68 exceeds a threshold, referred to as an "upper set point." Once this occurs, the controller 52 deactivates the heating element 56 such that it stops heating the water within the tank 53. As such, the water in the lower portion of the tank 53 can be maintained in a desired temperature range. Exemplary techniques for controlling the operation of heating elements 55 and/or 56 are described in the following commonly assigned patent applications: U.S. patent application Ser. No. 10/772,032, entitled "System and Method for Controlling Temperature of a Liquid Residing within a Tank," and filed on Feb. 4, 2004; U.S. patent application Ser. No. 11/117,069, entitled "Water Heating System and Method for Detecting a Dry Fire Condition for a Heating Element," and filed on Apr. 28, 2005; and U.S. patent application Ser. No. 11/677,312, entitled "Water Heating Systems and Methods for Detecting Dry Fire Conditions" and filed on Feb. 21, 2007. Each of the foregoing patent applications is incorporated herein by reference.

Figure 2:
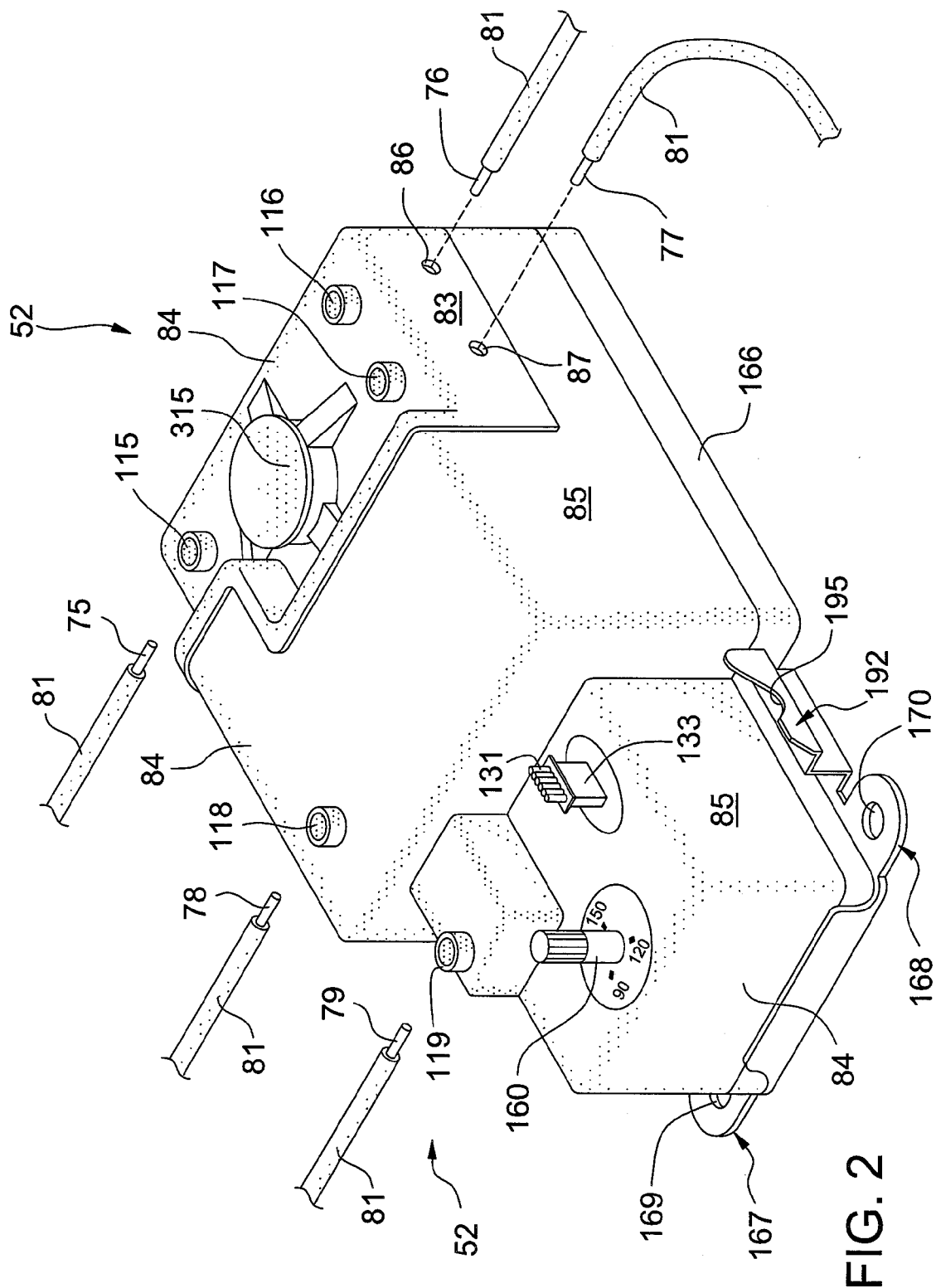
FIG. 2 depicts an exemplary controller that is electronically actuated and may be used to control a water heating system, such as is depicted in FIG. 1.

FIG. 2 depicts an exemplary embodiment of the controller 52. As will be described in more detail hereafter, the controller 52 is coupled to a plurality of conductive wires 75-79 to enable the controller 52 to selectively activate the heating elements 55 and 56 (FIG. 1). Each wire 75-59 preferably has a coating 81 composed of electrically insulating material that covers the wire except for the ends of the wire. Moreover, once the wires 75-59 are installed, as will be described in more detail hereafter, they are substantially unexposed.

The electrical components of the controller 52 are preferably housed within and covered by a housing 84. The housing 84 has holes respectively corresponding with the wires 75-79 to enable the wires to be electrically connected to electrical components within the housing 84. For example, as shown by FIG. 2, the housing 84 has a hole 86 corresponding with the wire 76. During installation, the wire 76 is inserted through the hole 86 and coupled to electronic components within the housing 84. Further, the housing 84 has a hole 87 corresponding with the wire 77. During installation, the wire 77 is inserted through the hole 87 and coupled to electronic components within the housing 84. Holes corresponding to the wires 75, 78, and 79 exist on the opposite side of the controller 52 to enable these wires 75, 78, and 79 to be similarly coupled to electronic components within the housing 84.

In one exemplary embodiment, the housing 84 comprises two sections 85 and 83 that can be removed separately. In this regard, section 83 can be removed from section 85. Therefore, the section 83 can be removed from the controller 52 without removing section 85. Alternatively, both sections 83 and 85 can be removed from the controller 52 with or without removing section 83 from section 85. In other embodiments, other numbers of housing sections are possible.

Figure 3:
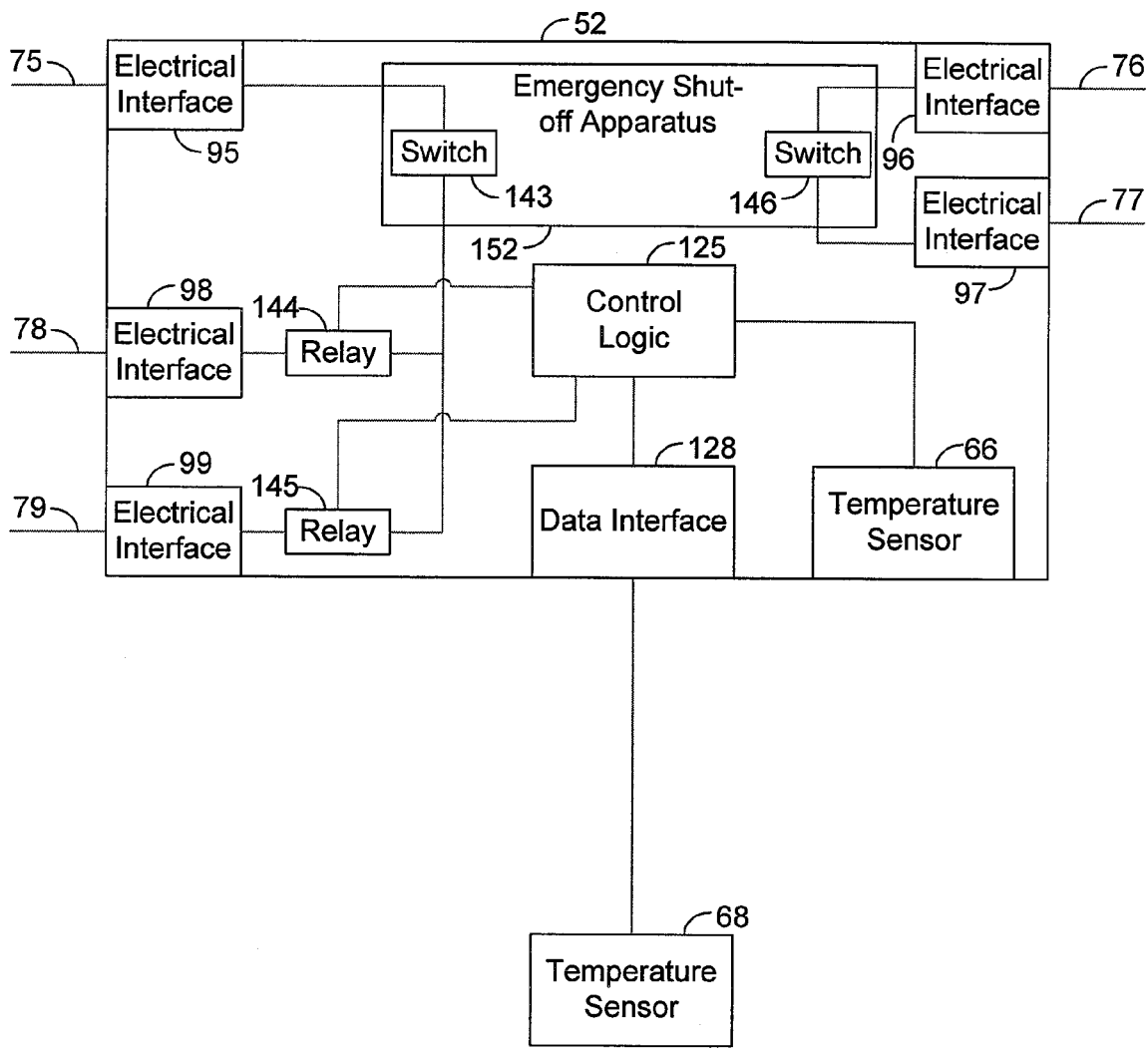
FIG. 3 is a block diagram illustrating an exemplary water heater controller, such as is depicted in FIG. 2.
Figure 4:
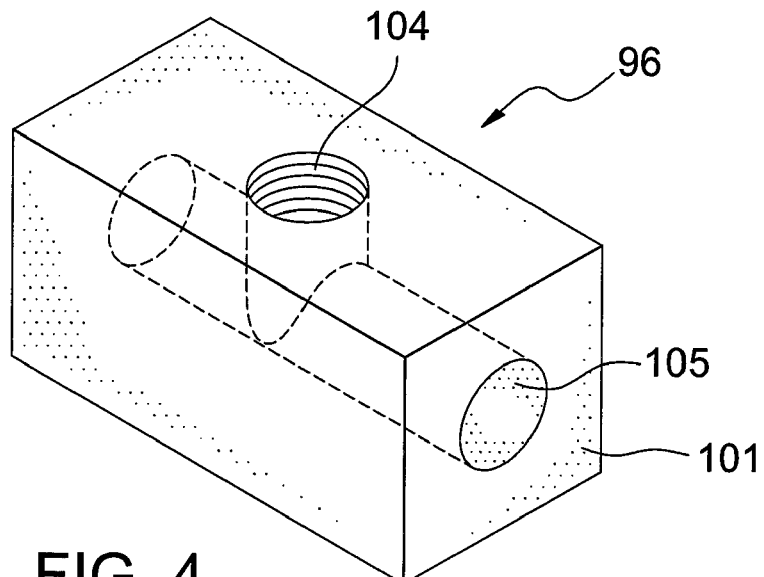
FIG. 4 depicts an exemplary electrical interface, such as is depicted in FIG. 3.
Figure 5:
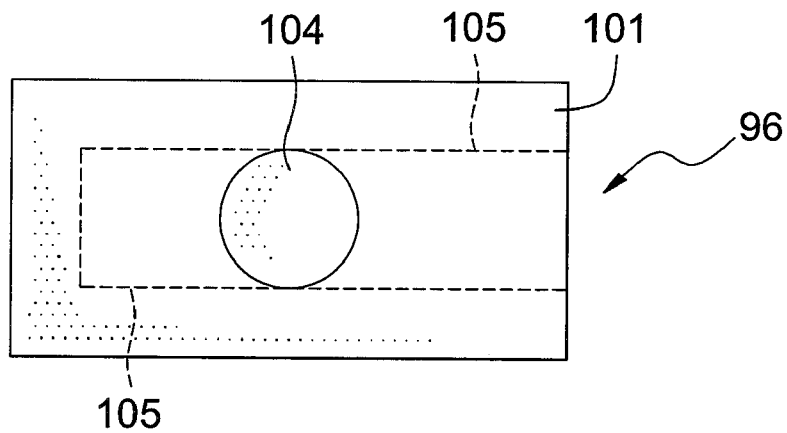
FIG. 5 depicts a top view of the electrical interface depicted in FIG. 4.

As shown by FIG. 3, the controller 52 comprises a plurality of electrical interfaces 95-99 that are electrically coupled to the wires 75-59, respectively. FIGS. 4 and 5 depict an exemplary embodiment for the electrical interface 96. The other interfaces 95 and 97-99 may be identically configured relative to interface 96.

As shown by FIG. 4, the electrical interface 96 comprises a block 101 of conductive material having a hole 104 for receiving a coupler 121, such as a screw, (FIG. 6) and a hole 105 for receiving the wire 76. Note that, in one embodiment, each coupler 121 is implemented as a screw and will be referred to hereafter as such. However, each coupler 121 may be implemented as other types of devices, such as a bolt, in other embodiments. Moreover, the coupler 121 may be any device that applies pressure to the wire inserted in hole 105 so that frictional forces secure such wire to the interface 96.

The walls of the hole 104 are preferably threaded. Further, the hole 105 is aligned with the hole 86 (FIG. 2) of the housing 84 so that the wire 76 can be inserted through holes 105 and 86 and exposed by hole 104. Thus, by inserting a screw 121 through the hole 104 and screwing it down, the screw 121 eventually contacts and presses against the wire 76. The force applied to the wire 76 by the screw rigidly holds the wire 76 within the block 101 so that the wire 76 is not easily removed from the block 101. In other words, the screw 121 is preferably screwed down until the wire 76 is secured to the block 101. Note that the wires 75 and 77-79 may be similarly secured to the interfaces 95 and 97-99, respectively.

The housing 84 has a hollow peg 116 (FIG. 2) extending from a surface of the housing 84. The hole passing through the peg 116 is aligned with the hole 104 (FIG. 4) such that a screw 121 can be inserted through the peg 116 and into the hole 104. Further, the hole in the peg 116 provides access to the screw as it is being screwed into the block 101. In this regard, a screwdriver can be inserted through the peg 116 and used to rotate the screw until it is sufficiently pressed against the wire 76. Other pegs 115 and 117-119 may be similarly aligned with holes in the interfaces 95 and 97-99 and used to secure the wires 75 and 77-79 to these interfaces 95 and 97-99, respectively.

Figures 6, 7:
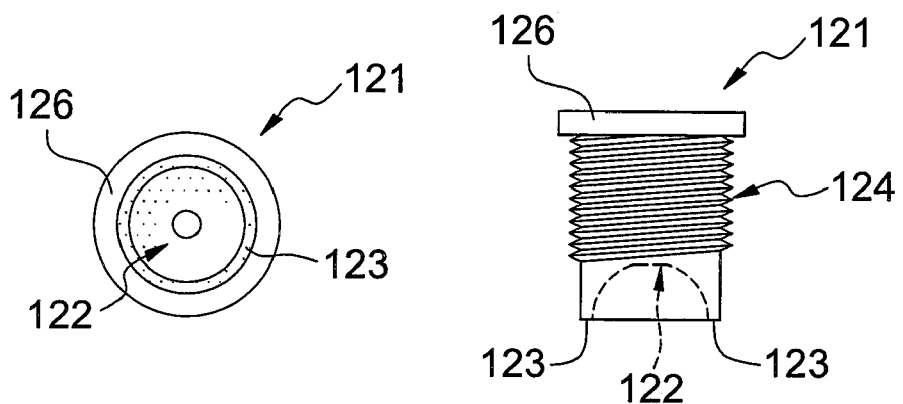
FIG. 6 depicts a bottom view of a screw that may be used to secure a wire inserted into an electrical interface, such as is depicted in FIG. 4.
FIG. 7 depicts a side view of the screw depicted in FIG. 6.

FIGS. 6 and 7 show an exemplary screw 121 that may be used to secure any of the wires 75-59 to the interfaces 95-99 as described herein. The screw 121 has a hollow point on the end that contacts the wire being secured by the screw 121. In particular, the end of the screw 121 that contacts the wire has a cavity 122, as shown by FIGS. 6 and 7. Therefore, the end of the screw 121 has a rim 123 that contacts the wire being secured by the screw 121. FIG. 6 depicts a bottom view of the screw 121 showing the rim 123 and walls defining the cavity 122. The existence of the cavity 122 decreases the surface area contacting the wire thereby increasing the pressure applied by the screw 121 to the wire. As shown by FIG. 7, the screw 121 has threads 124, and the screw 121 has a head 126, which may have small channels (not shown) on its surface for receiving a screwdriver.

Note that, when the wires 75-79 are secured to the interfaces 95-99 as described herein, the ends of wires 75-79 shown in FIG. 2 are substantially unexposed. In this regard, the coating 81 of each wire 75-79 covers the wire except for the tip that is to be inserted into the housing 84. Further, the housing 84 is preferably composed of an electrically insulating material, such as plastic. Moreover, the housing 84 covers and protects the interfaces 95-99 and the wire tips inserted into them, and the coatings 81 cover the remaining portions of the wire ends shown in FIG. 2. Having the wire ends completely covered by the housing 84 and the coatings 81 helps to reduce the chance of an inadvertent electrical contact with the wires 75-79. Also, if any water is splashed on the controller 52, the housing 84 and coatings 81 should prevent such water from reaching the wires 75-79. Moreover, to provide better electrical insulation for the wires, the ends of the pegs 115-119 may be capped to prevent exposure of the screws 121 used to secure the wires 75-59 to the controller 52.

To ensure that no portions of the wire ends inserted into the housing 84 are exposed, the housing holes through which the wire ends are inserted are preferably dimensioned large enough such that the respective wire and its coating fit through the hole. For example, hole 86 (FIG. 2) is preferably dimensioned large enough so that the wire 77 and its coating 81 fit through the hole 86, and hole 87 is dimensioned large enough so that the wire 76 and its coating fit through the hole 87. In one embodiment, each such hole is just large enough to allow the respective wire and coating to pass. Indeed, the housing wall defining the hole preferably contacts the wire coating so that water cannot penetrate the housing 84 through the hole.

As shown by FIG. 3, control logic 125 within the controller 52 generally controls the operation of the heating elements 55 and 56 (FIG. 1). The control logic 125 can be implemented in software, hardware, or a combination thereof. In one exemplary embodiment, the control logic 125 is implemented in software and executed by an instruction executing apparatus, such as a microprocessor (not specifically shown), for example. The instruction executing apparatus preferably has input and output ports for enabling the control logic 125 to transmit and receive information to and from other components of the controller 52 and/or system 50.

Note that the control logic 125, when implemented in software, can be stored and transported on any computer-readable medium. A "computer-readable medium" can be any means that can contain, store, communicate, propagate, or transport a program for use by or in connection with an instruction execution apparatus. The computer readable-medium can be, for example but not limited to, an electronic, magnetic, optical, electromagnetic, infrared, or semiconductor apparatus or propagation medium.

Referring to FIG. 3, the controller 52 preferably comprises a data interface 128 for enabling the control logic 125 to communicate data signals with components external to the controller 52. In this regard, the data interface 128 is preferably electrically coupled to and secured to one or more wires 131 (FIG. 2) that are coupled to one or more external devices. For example, one of the wires 131 may be coupled to the temperature sensor 68 used to control the lower heating element 56. Moreover, data indicative of the temperatures sensed by this sensor 68 may be transmitted to the control logic 125 via the interface 128. In the exemplary embodiment shown by FIG. 2, the interface 128 is covered by an insulator 133 that is composed of insulating material, such as rubber. A hole in the insulator 133 allows one or more wires to be coupled to the interface 128.

In one embodiment, the wires 131 may be coupled to an additional controller (not shown), a display device, or other device for performing various functions regarding the control of the system 50. Exemplary devices that may be coupled to the wires 131 or otherwise coupled to the controller 52 are described in U.S. patent application Ser. No. 11/692,182, entitled "Modular Control System and Method for Water Heaters," and filed on Mar. 27, 2007, which is incorporated herein by reference.

In one exemplary embodiment, the wires 75 and 76 are coupled to a power source (not shown) and provide electrical power to the controller 52. This power is not only used to power various components, such as the instruction executing apparatus used to execute the instructions of the control logic 125, but is also used to selectively power and, therefore, activate the heating elements 55 and 56. Note that the controller 52 may have a transformer (not shown in FIG. 3) for changing the voltage of the electrical power delivered to one or more components. For example, the power source may provide a 120 or 240 Volt (V) alternating current (AC) power signal, and a transformer may transform such power signal to a direct current (DC) signal having a desired voltage, such as 5 V, for example, for powering at least some components of the controller 52. In one exemplary embodiment, a 120 V AC power signal is used to power the heating elements 55 and 56, but a 5 V DC signal is used to power at least a portion of the control logic 125 and/or an instruction executing apparatus that is used to execute instructions of the control logic 125, if the control logic 125 is implemented in software.

The interface 95 secured to the wire 75 is electrically coupled to the interface 98 through a relay 144 and a mechanical switch 143 of an emergency shut-off apparatus 152, which will be described in more detail hereafter. The interface 95 is also electrically coupled to the interface 99 through a relay 145 and switch 143. If the switch 143 is in a closed state, then the voltage of the wire 75 is applied to the relays 144 and 145. If the switch 143 is in an open state, then the interfaces 98 and 99 are electrically isolated from the wire 75 by the switch 143.

In addition, the interface 96 secured to the wire 76 is electrically coupled to the interface 97 through a mechanical switch 146 of the emergency shut-off apparatus 152. If the switch 146 is in a closed state, then the voltage of the wire 76 is applied to the interface 97. If the switch 146 is in an open state, then the interface 97 is electrically isolated from the wire 76 by the switch 146.

The apparatus 152 is configured to detect when a temperature of the water within the tank 53 has exceeded a predefined threshold indicating that the water temperature is reaching an unsafe range and/or indicating that the water heating system 50 may have a malfunction. In response to such a detection, the apparatus 152 disables at least the heating elements 55 and 56 until the apparatus 152 later receives a manual input indicating that operation of the heating elements 55 and 56 is to be restarted. In one embodiment, the apparatus 152 disables the heating elements 55 and 56 by placing the switches 143 and 146 in open states such that the interfaces 97-99 are electrically isolated from interfaces 95 and 96 and, therefore, from wires 75 and 76 coupled to the power source (not shown). When the apparatus 152 receives a manual input from a user indicating that operation of the heating elements 55 and 56 is to be restarted, the apparatus 152 transitions each of the switches 143 and 146 from an open state to a closed state, provided that the temperature detected by the apparatus 152 has fallen to a normal range below the predefined threshold.

Various safety standards require that the operation of the components for shutting off power to the heating elements 55 and 56 in an emergency to be separate from the operation of the components used to control the heating elements 55 and 56 in normal operation. To comply with such requirements, the operation of the components of the emergency shut-off apparatus 152 is preferably separate from and independent of the operation of the control logic 125.

Further, the emergency shut-off apparatus 152 may be implemented in hardware, software, or a combination thereof. In the embodiment depicted by FIG. 3, the apparatus 152 is implemented exclusively in hardware and is mechanically actuated. In this regard, the disabling of the heating elements 55 and 56 is achieved by mechanical forces resulting from thermal stresses. In particular, the emergency shut-off apparatus 152 comprises a temperature sensitive element (not shown in FIG. 3), such as a bimetallic disc, that moves due to thermal stresses when the temperature of the disc exceeds a threshold. Further, such movement of the temperature sensitive element changes the state of the switches 143 and 146 (i.e., places them in open states) so that no current flows through the apparatus 152 from the interfaces 75 and 76. When the heating elements 55 and 56 are to be enabled, a user input mechanically forces the temperature sensitive back to its original position prior to disabling the heating elements 55 and 56. Moreover, the states of the switches 143 and 146 are controlled via mechanical forces rather than electrical control signals. An exemplary configuration of an emergency shut-off apparatus 152 that is mechanically actuated is described in U.S. patent application Ser. No. 11/105,889, entitled "Trip-Free Limit Switch and Reset Mechanism," and filed on Apr. 15, 2005, which is incorporated herein by reference.

In other embodiments, the emergency shut-off apparatus 152 may be electronically actuated, and portions of the apparatus 152 may be implemented in software, if desired. In this regard, rather having a temperature sensitive element that moves due to thermal stresses, the apparatus 152 may be configured to sense a temperature and provide electrical signals for controlling relays (not shown in FIG. 3), in lieu of mechanical switches 143 and 146, in order to enable or disable the heating elements 55 and 56 as appropriate. However, as will be described in more detail hereafter, using an emergency shut-off apparatus 152 that is electronically actuated may, at least to some extent, increase temperatures within the controller 52 and/or increase the size requirements of the controller 52. In particular, to meet the safety standards discussed above regarding separate control of the emergency shut-off apparatus 152 and control logic 125, the same circuitry used to control the relays 144 and 145 should not be used to control the apparatus 152. Thus, if the emergency shut-off apparatus 152 is electronically actuated, then additional circuitry may be required relative to the circuitry that is required to implement the control logic 125.

In addition, in one embodiment, the switches 143 and 146 are also coupled to a transformer that transforms the power from the interfaces 95 and 96 into a form suitable for powering various components of the controller 52, such as the control logic 125. Thus, in an emergency shut-off condition, power is cut-off to the control logic 125 as well as the heating elements 55 and 56. Indeed, if desired, the apparatus 152 may cut power to all electrically-powered components of the controller 52.

The wire 77 is electrically coupled to the upper and lower heating elements 55 and 56 (FIG. 1). Thus, if the switch 146 has not been placed in an open state by the apparatus 152, then the voltage of the wire 76 is applied to both heating elements 55 and 56. In another possible embodiment, an additional electrical interface (not shown) may be used to electrically couple the interface 96 to one heating element 55 or 56 while the interface 97 is used to electrically couple the interface 96 to the other heating element 55 or 56. Such a configuration may eliminate splicing of the wire 77 secured to the interface 97. Any such additional interface may be coupled to the interface 96 through a switch controlled by the apparatus 152 so that the wire 76 can be electrically isolated from the additional interface by the apparatus 152 in the event of a detection of an emergency shut-off condition.

The wire 78 is electrically coupled to the upper heating element 55. If the control logic 125 determines that the upper heating element 55 is to be activated, the control logic 125 places the relay 144 into a closed state. In this regard, the control logic 125 transmits, to the relay 144, an electrical control signal for transitioning the relay 144 to a closed state. In such case, the voltage of the wire 75 is applied, through the switch 143 and relay 144, to the wire 78 and, therefore, the upper heating element 55 thereby activating the upper heating element 55, assuming that the apparatus 152 has not placed the switch 143 in an open state. If the control logic 125, however, determines that the upper heating element 55 is to be deactivated, the control logic 125 places the relay 144 into an open state. Accordingly, the wire 75 is electrically isolated from the wire 78 and, therefore, the upper heating element 55 thereby deactivating the upper heating element 55. In this regard, the heating element 55 is preferably activated only when electrically coupled to both wires 75 and 76 via the controller 52 and, therefore, receiving power from the power source (not shown) connected to these wires 75 and 76.

The wire 79 is electrically coupled to the lower heating element 56. If the control logic 125 determines that the lower heating element 56 is to be activated, the control logic 125 places the relay 145 into a closed state. In this regard, the control logic 125 transmits, to the relay 145, an electrical control signal for transitioning the relay 145 to a closed state. In such case, the voltage of the wire 75 is applied, through the switch 143 and relay 145, to the wire 79 and, therefore, the lower heating element 56 thereby activating the lower heating element 56, assuming that the apparatus 152 has not placed the switch 143 into an open state. If the control logic 125, however, determines that the lower heating element 56 is to be deactivated, the control logic 125 places the relay 145 in an open state. Accordingly, the wire 75 is electrically isolated from the wire 79 and, therefore, the lower heating element 56 thereby deactivating the lower heating element 56. In this regard, the heating element 56 is preferably activated only when electrically coupled to both wires 75 and 76 via the controller 52 and, therefore, receiving power from the power source (not shown) connected to these wires 75 and 76.

As shown by FIG. 2, the controller 52 comprises a rotatable dial 160 that can be turned to manually set the upper set points for the heating elements 55 and 56. In one mode of operation, the controller 52 controls the activation states of both heating elements 55 and 56 using the temperature value indicated by the dial 160 as the upper set point for both elements 55 and 56. In such mode, the lower set point for both elements can be a predefined amount (e.g., twenty degrees Fahrenheit) below the upper set point indicated by dial 160. Various other techniques for establishing the upper and lower set points are possible.

Figure 8:
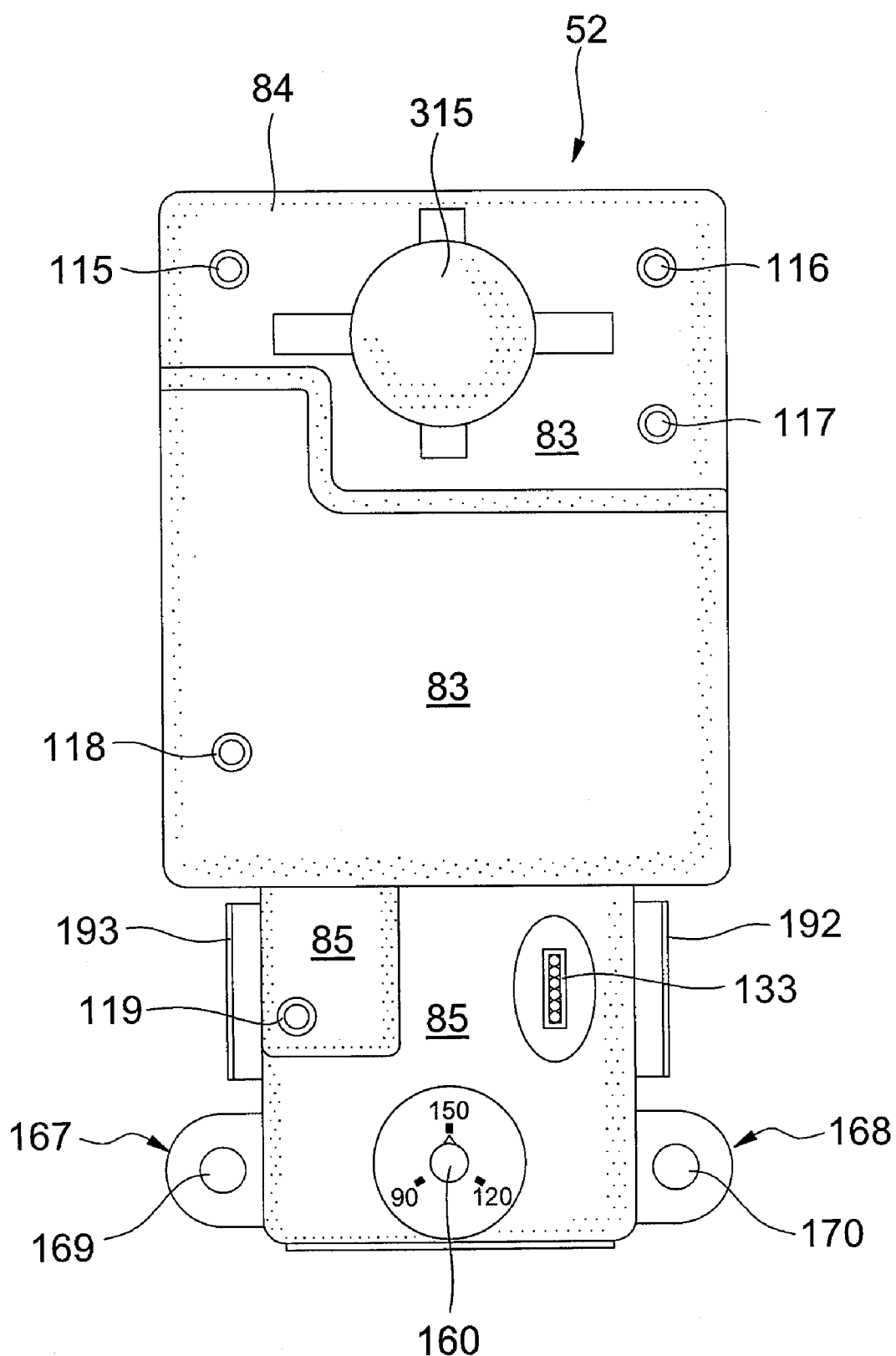
FIG. 8 depicts a front view of an exemplary water heater controller, such as is depicted in FIG. 3.
Figure 9:
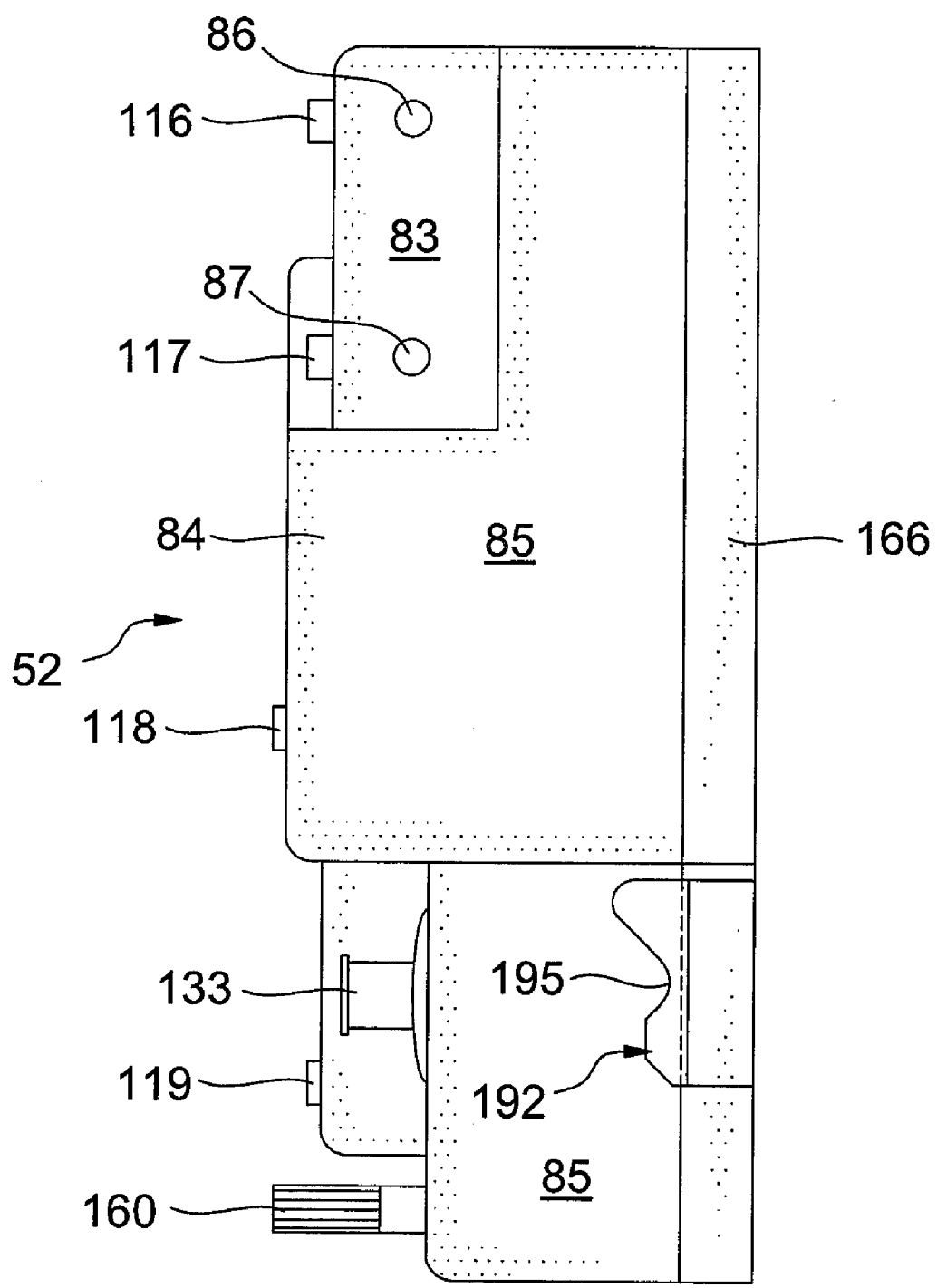
FIG. 9 depicts a side view of the water heater controller depicted in FIG. 8.
Figure 10:
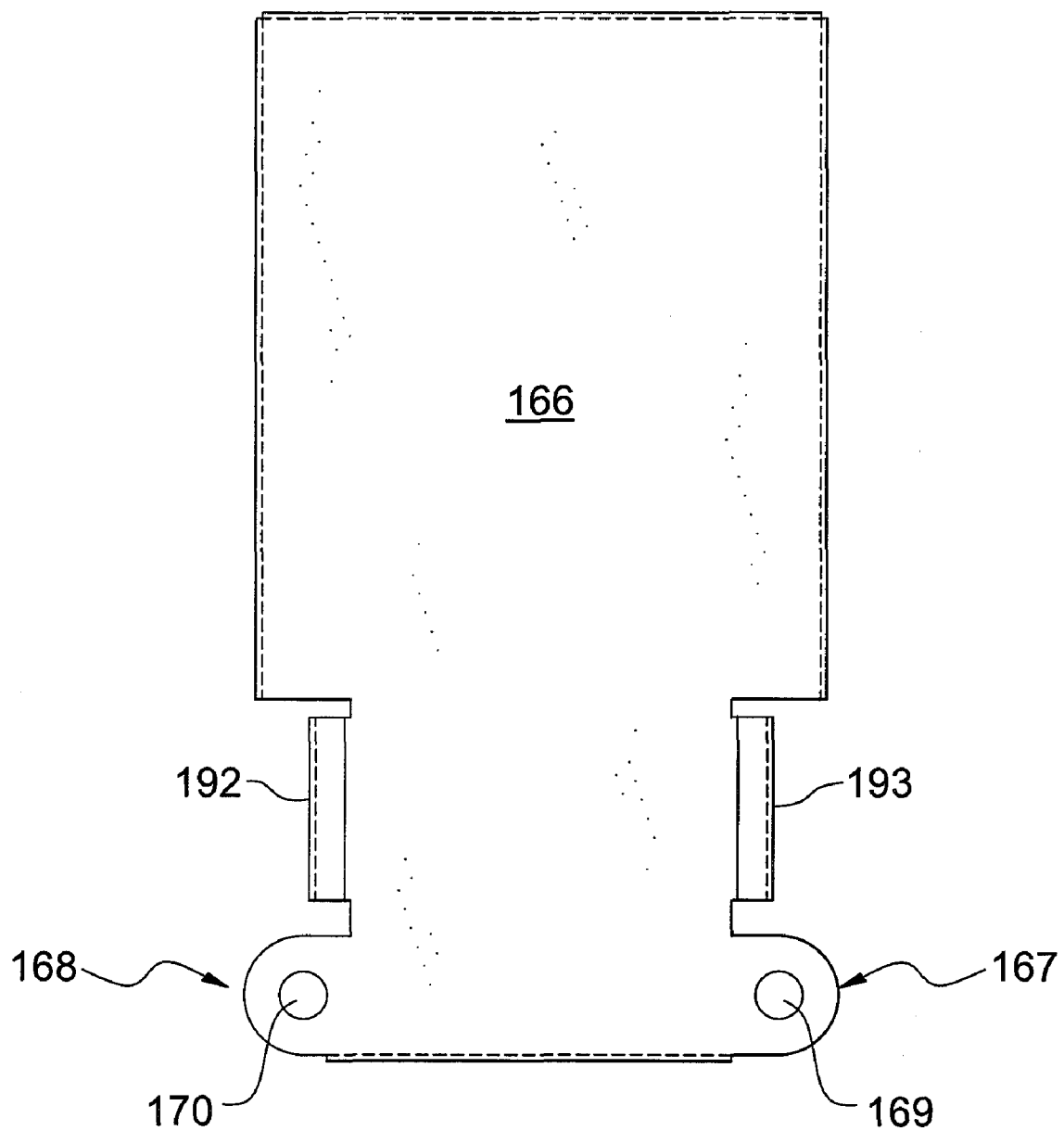
FIG. 10 depicts a back view of the water heater controller depicted in FIG. 8.

Also shown by FIG. 2 is a thermally conductive base 166 that is attached to the housing 84. This base 166 has two wings 167 and 168 with two holes 169 and 170, respectively, for enabling the controller 52 to be mounted on the tank 53. In this regard, screws may be inserted through the holes 169 and 170 and into the tank 53 thereby securing the controller 52 to the tank 53. FIG. 8 depicts a front view of an exemplary controller 52 illustrating the wings 167 and 168 of the base 166. FIG. 9 depicts a side view of the controller 52 that is depicted in FIG. 8, and FIG. 10 depicts a back view of this controller 52.

Figure 11:
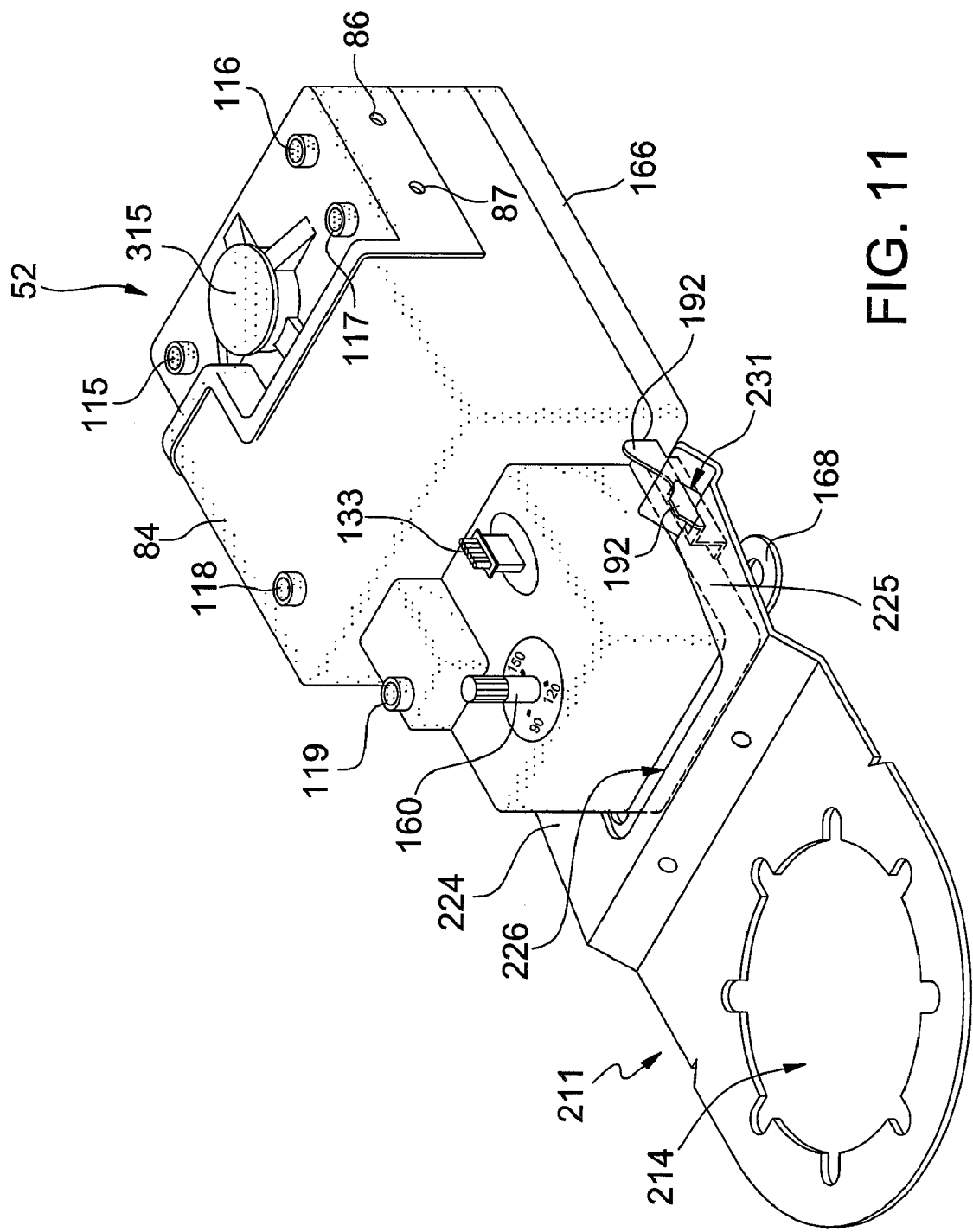
FIG. 11 depicts the water heater controller of FIG. 8 coupled to a conventional bracket that may be used to mount the controller on a water tank.
Figure 12:
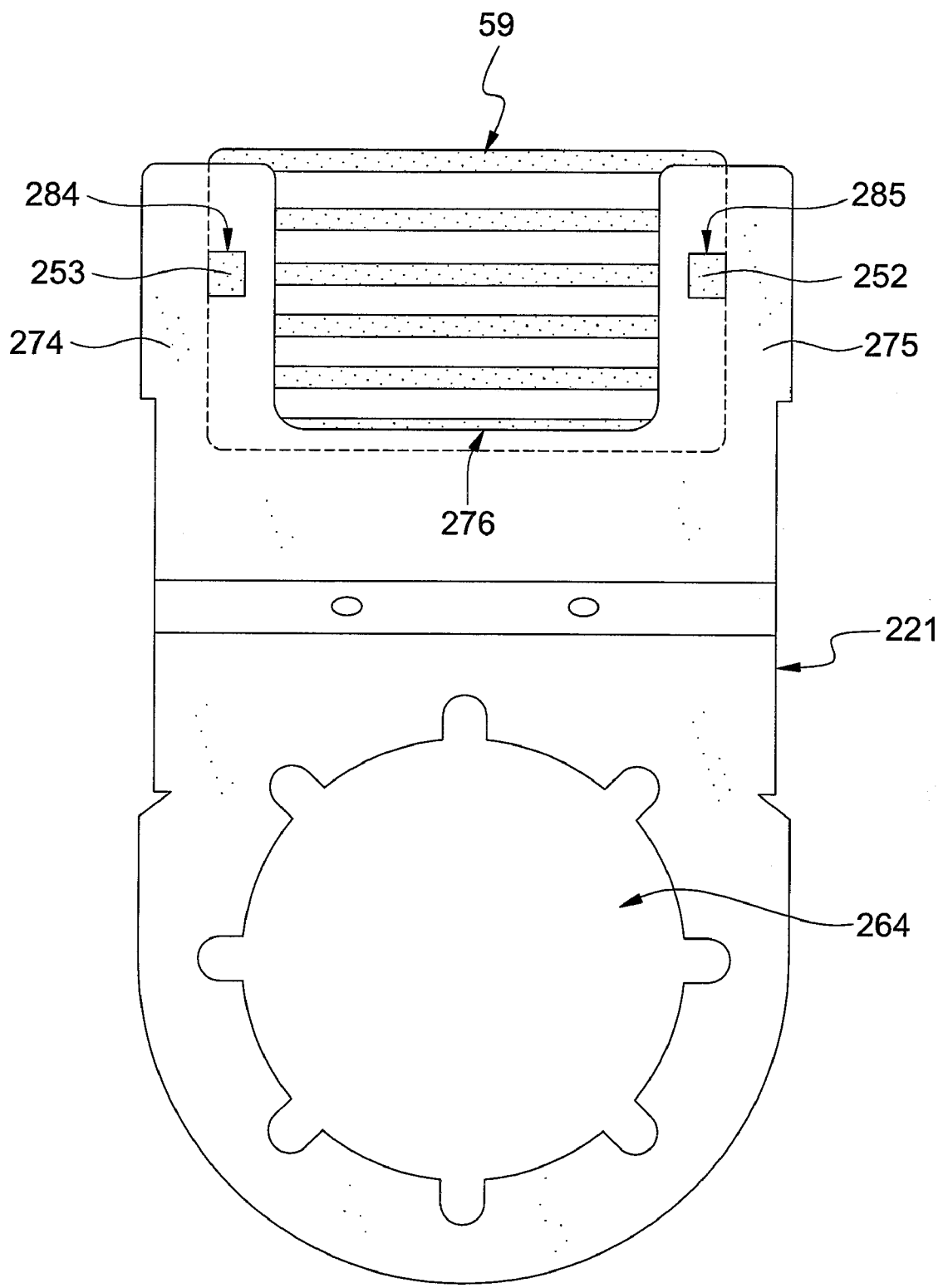
FIG. 12 depicts an exemplary sensor holding apparatus coupled to a conventional bracket that may be used to mount the apparatus on a water tank.

Referring to FIGS. 2 and 8-10, the base 166 has two notched edges 192 and 193 to facilitate mounting of the controller 52 on the tank 53. In this regard, FIG. 11 shows the controller 52 joined with a conventional bracket 211 typically used for mounting heating elements to tanks of water heaters. In this regard, the bracket 211 has a hole 214 through which the base 58 of a heating element 55 or 56 may be inserted. Note that FIG. 12, shows a bracket 221 identical to the bracket 211 shown by FIG. 12. Moreover, the bracket 211 of FIG. 11 has two arms 224 and 225 that form a notch 226 between the two arms 224 and 225. When the bracket 211 is used to mount the controller 52 to the tank 53, the bottom of the controller 52 is positioned within the notch 226 as shown by FIG. 11. Each arm 224 and 225 has a respective hole, such that the corresponding edge 192 or 193 can extend through the hole. For example, as shown by FIG. 11, the arm 225 has a hole 231 through which a portion of the edge 192 extends when the end of the arm 225 is inserted into the notch 195 as shown by FIG. 11. A portion of the edge 193 similarly extends through a hole in the arm 224. Via such a mounting, the bracket 211 presses the base 166 against the tank 53.

As shown by FIG. 11, a bottom portion of the controller 52 is dimensioned to fit within the notch 226 of the bracket 211 defined by the two arms 225 and 226. A top portion of the controller 52 outside of the notch 226 is larger than the bottom potion. In at least one exemplary embodiment, such as the embodiment described hereafter with reference to FIG. 17, the emergency shut-off apparatus 152, a transformer 667, and at least one relay 144 or 145 are located in the top portion, and the control logic 125 and temperature sensor 66 are located in the bottom portion between the arms 225 and 226. Such positioning, at least to some extent, helps to keep the control logic 125 and temperature sensor 66 away from the relatively high heat generated by the aforedescribed components in the top portion.

Figure 13:
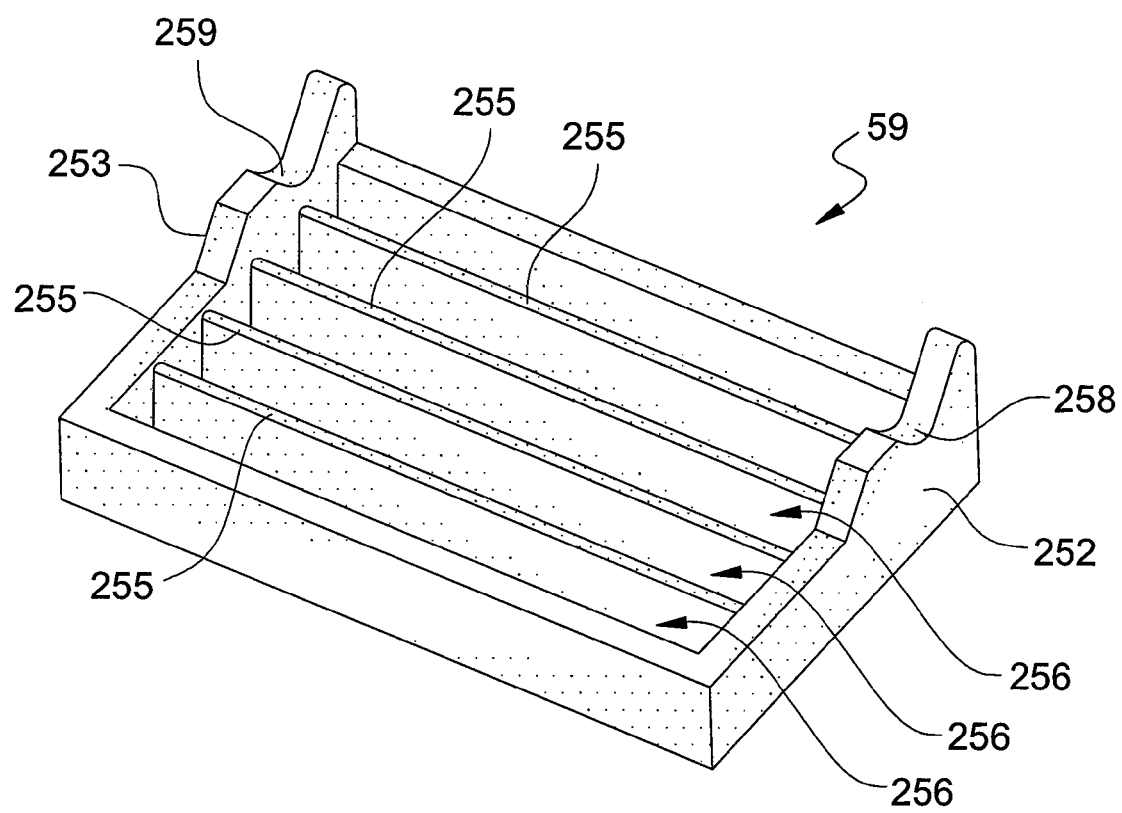
FIG. 13 depicts the sensor holding apparatus of FIG. 12.

Moreover, a bracket 221 identical to the bracket 211 described above may be used to mount the sensor holding apparatus 59 to the tank 53. FIG. 13 depicts an exemplary sensor holding apparatus 59. The temperature sensor 68 (FIG. 3) is embedded in or otherwise coupled to the apparatus 59. The temperature sensor 68 may contact the side of the apparatus 59 that is mounted against the tank 53 in order to enhance the sensor's sensitivity to the tank's temperature. Further, the side of the apparatus 59 contacting the sensor 68 may be thermally conductive.

Figure 34:
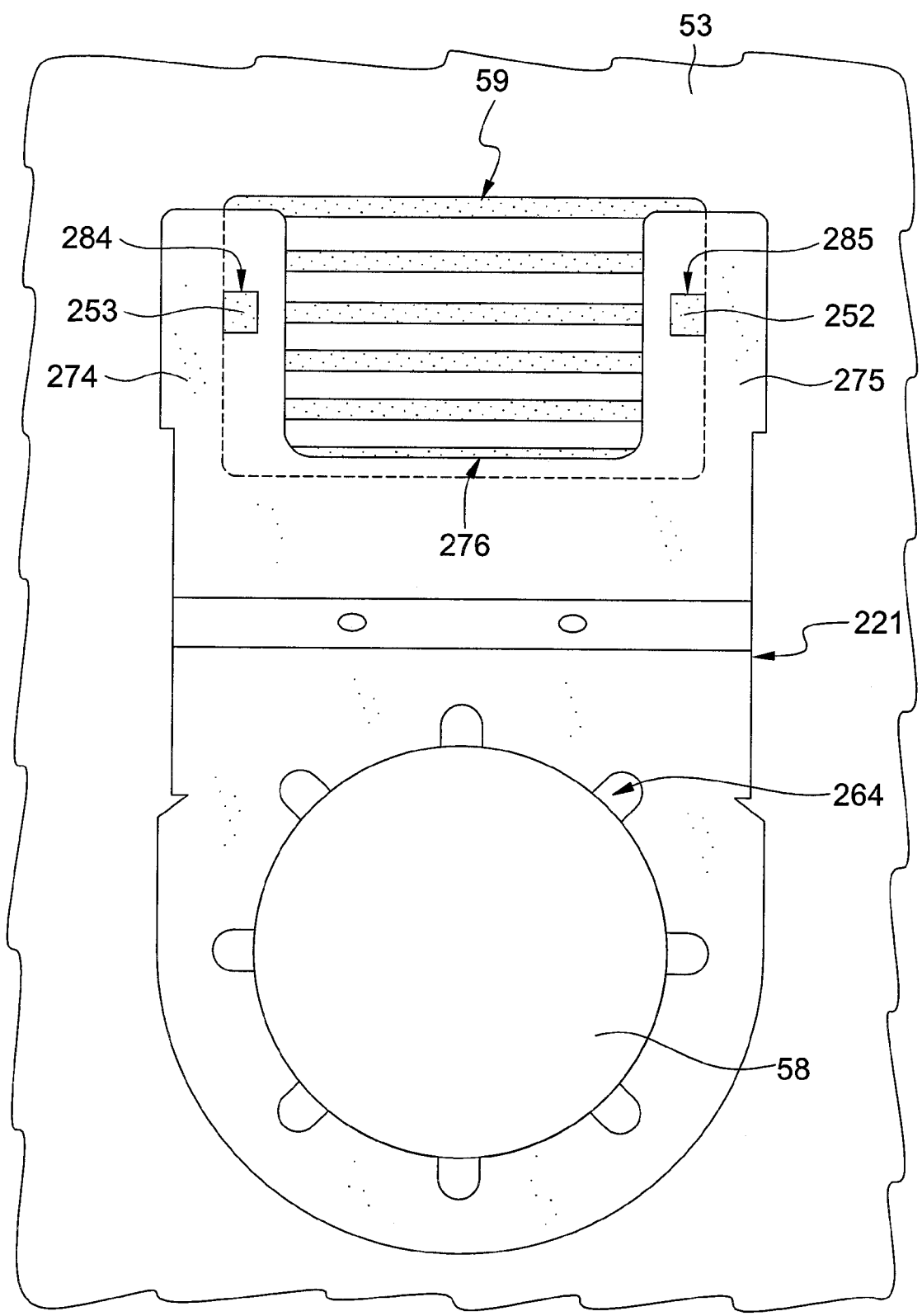
FIG. 34 depicts a temperature holding apparatus, such as is depicted by FIG. 13, mounted on a tank via the bracket depicted by FIG. 12.

As shown by FIG. 13, the apparatus 59 has two notched edges 252 and 253. Between the two edges 252 and 253 are a plurality of substantially parallel fins 255 forming a plurality of channels 256. Further, the edges 252 and 253 have notches 258 and 259, respectively, to facilitate mounting of the apparatus 59 to the tank 53 via the bracket 221 of FIG. 12. In this regard, the bracket 221 has a hole 264 through which the base 58 of a heating element 55 or 56 may be inserted. Further, the bracket 221 has two arms 274 and 275 that form a notch 276 between the two arms 274 and 275. When the bracket 221 is used to mount the sensor holding apparatus 59 to the tank 53, the apparatus 59 is positioned within the notch 276 as shown by FIG. 12. Each arm 274 and 275 has a respective hole 284 and 285, such that the corresponding edge 253 or 252 can extend through the hole. For example, as shown by FIG. 12, the arm 274 has a hole 284 through which a portion of the edge 253 extends when the end of the arm 274 is inserted into the notch 259 (FIG. 13) as shown by FIG. 12. Further, the arm 275 has a hole 285 through which a portion of the edge 252 extends when the end of the arm 275 is inserted into the notch 258 (FIG. 13) as shown by FIG. 12. FIG. 34 depicts the sensor holding apparatus 59 mounted to the tank 53 via the bracket 221. As shown by FIG. 34, the base 58 of the heating element 56 passes through the hole 264 of bracket 221. Further, the bracket 221 presses the apparatus 59 against the tank 53.

Figure 14:
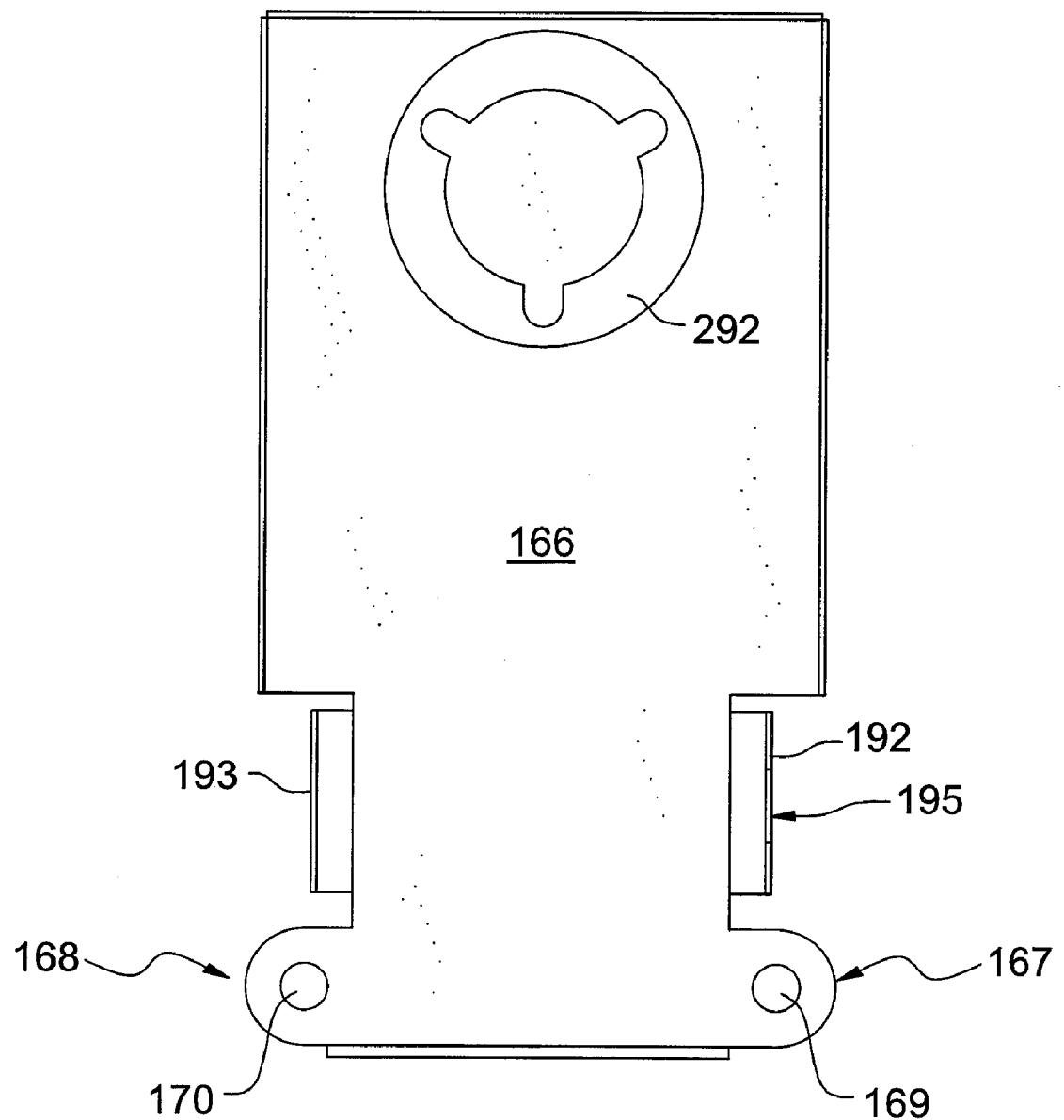
FIG. 14 depicts an opposite side of the base depicted in FIG. 10.

FIG. 10 shows the base 166. The side of the base 166 shown in FIG. 10 is exposed when the housing 84 is attached to the base 166. FIG. 14 shows the opposite side of the base 166 depicted in FIG. 10. In this regard, FIG. 10 shows the side that faces the tank 53 when the controller 52 is mounted on the tank 53, and FIG. 14 shows the side internal to the controller 52 when the housing 84 and other components of the controller 52 are assembled. The side of the base 166 shown in FIG. 10 has a circular ring 292, which will be described in more detail hereafter. The ring 292 may have other, non-circular shapes in other embodiments.

Figure 15:
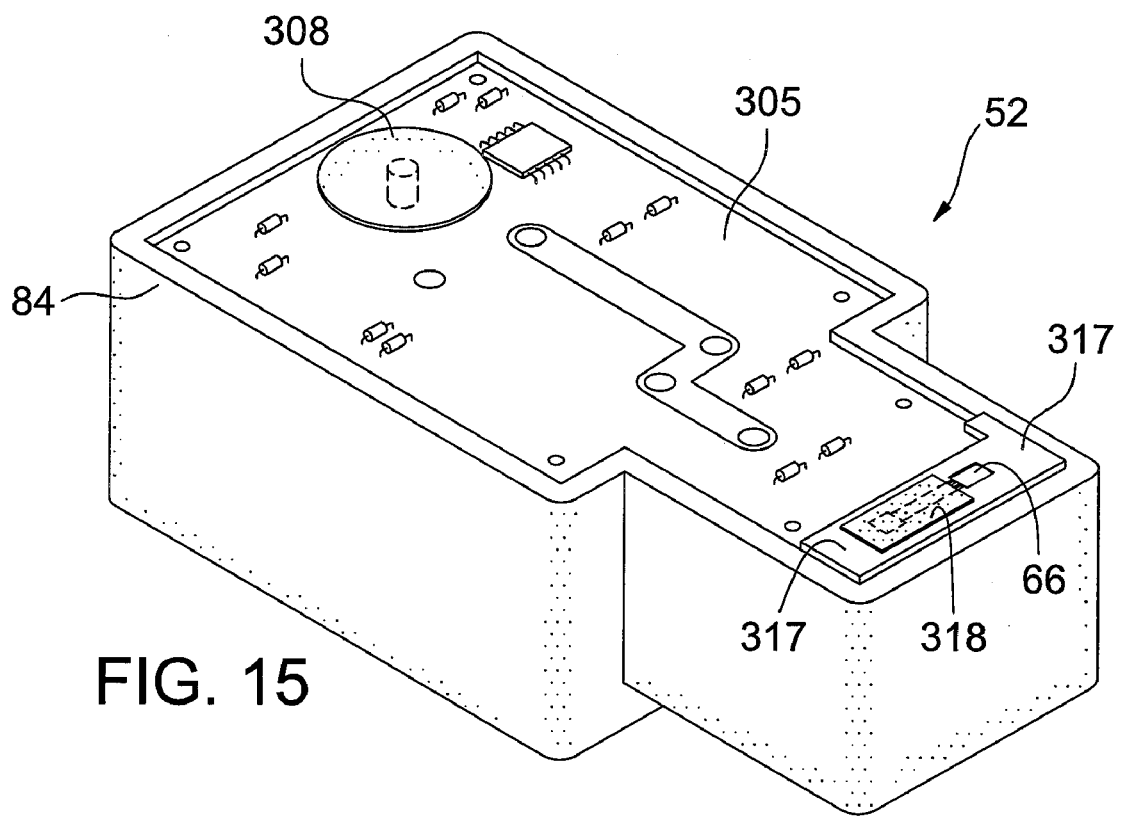
FIG. 15 depicts a three-dimensional back view of the water heater controller of FIG. 10 with its base removed, for illustrative purposes, to expose internal components of the controller.

FIG. 15 depicts the controller 52 of FIG. 10 with the base 166 removed to expose a printed circuit board (PCB) 305 within the controller 52. Various electronics for controlling the operation of the system 50 may be mounted on the PCB 305. FIG. 15 shows a bimetallic disc 308 that may be used to implement a portion of the emergency shut-off apparatus 152 (FIG. 3). In this regard, when the base 166 is attached to the housing 84, the bi-metallic disc 308 contacts the ring 292 depicted in FIG. 14. If the temperature of the water within the tank 53 reaches a certain threshold, heat from the water causes the bimetallic disc 308 to actuate or move due to thermal stresses within the disc 308. In this regard, the disc 308 changes from a concave to a convex position thereby moving the center of the disc 308 out of the interior of the ring 292. Actuation of the disc 308 in this way moves a plunger 312 (FIG. 16) resulting in the switches 143 and 146 (FIG. 3) being transitioned to an open state thereby disabling the heating elements 55 and 56. Once the system 50 has been inspected and the temperature of the water within the tank 53 returned to a normal range, the disc 308 can be manually moved back to its pre-actuation state.

Figure 16:
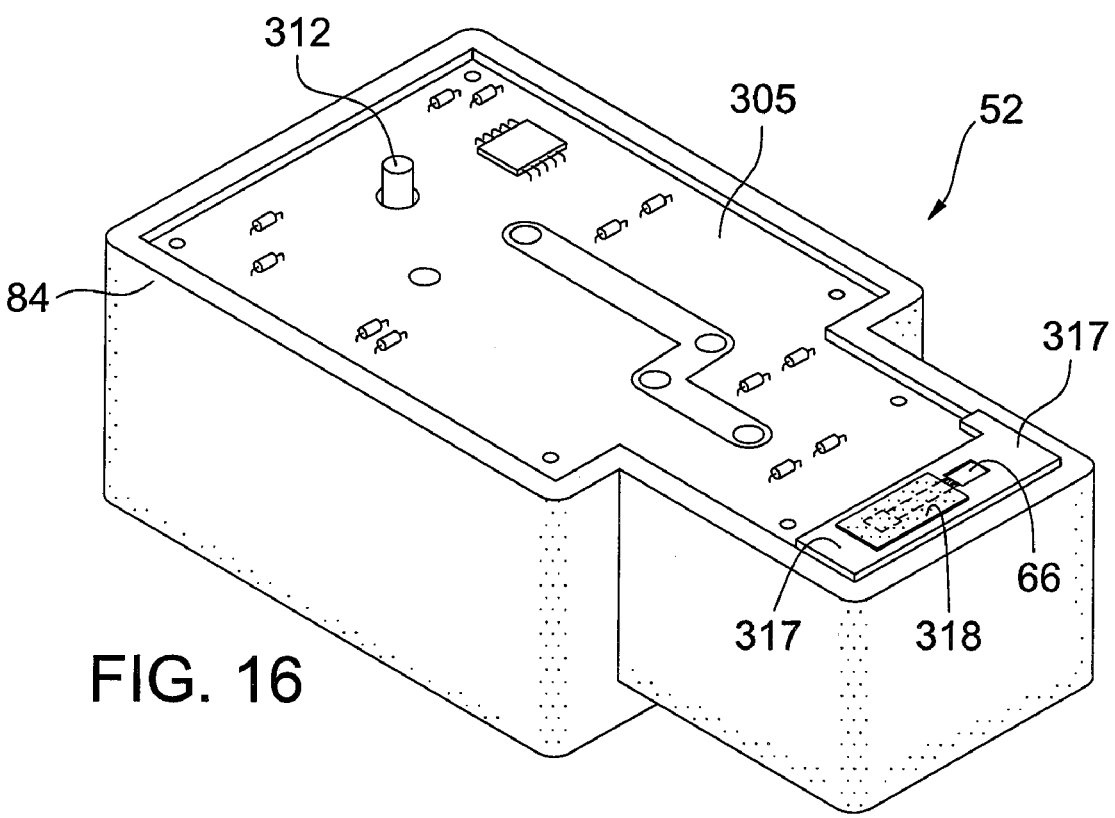
FIG. 16 depicts the water heater controller of FIG. 15 with a bi-metallic disc removed, for illustrative purposes, to expose a plunger.

FIG. 16 shows the controller 52 of FIG. 15 with the disc 308 removed to show an end of the plunger 312. Moreover, the plunger 312 is coupled to a button 315 (FIG. 2) that can be depressed to return the disc 308 to its pre-actuation state. In this regard, manually pressing the button 315 moves the plunger in a direction toward the disc 308 mechanically forcing the disc 308 back to its concave position. Exemplary configurations and operations of the apparatus 152 are described in more detail in U.S. patent application Ser. No. 11/105,889.

Between the PCB 305 and the base 166, which has been removed from FIGS. 15 and 16 for illustrative purposes, is a strip 317 of thermally insulating material, such as plastic. Attached to the strip 317, on a side opposite of the PCB 305, is the temperature sensor 66. Having the strip 317 positioned between the sensor 66 and the PCB 305 helps to shield the sensor 66 from heat generated by electronics mounted on the PCB 305. Further, by positioning electronics that generate a relatively high amount of heat on the opposite side of the PCB 305 (i.e., between the PCB 305 and housing 84), the PCB 305 also helps to shield heat from the sensor 66.

The sensor 66 can be electrically coupled to the PCB 305 via one or more wires extending through and/or over the strip 317 so that the sensor 66 can be electrically coupled to the control logic 125 via conductive connections on the PCB 305. When the base 166 is attached to the housing 84, the sensor 66 is preferably in contact with the base 166 to increase the sensor's sensitivity with respect to temperature changes in the base 166. A segment 318 of adhesive material may adhere the strip 317 to the base 166 to ensure that the strip 317 does not move relative to the base 166 and, therefore, that the sensor 66 remains in contact with the base 166. Moreover, during operation, the base 166 contacts a side of the tank 53, which is heated by the water within the tank 53, and the temperatures sensed by the sensor 66 are indicative of the water temperature within the tank 53.

Figure 17:
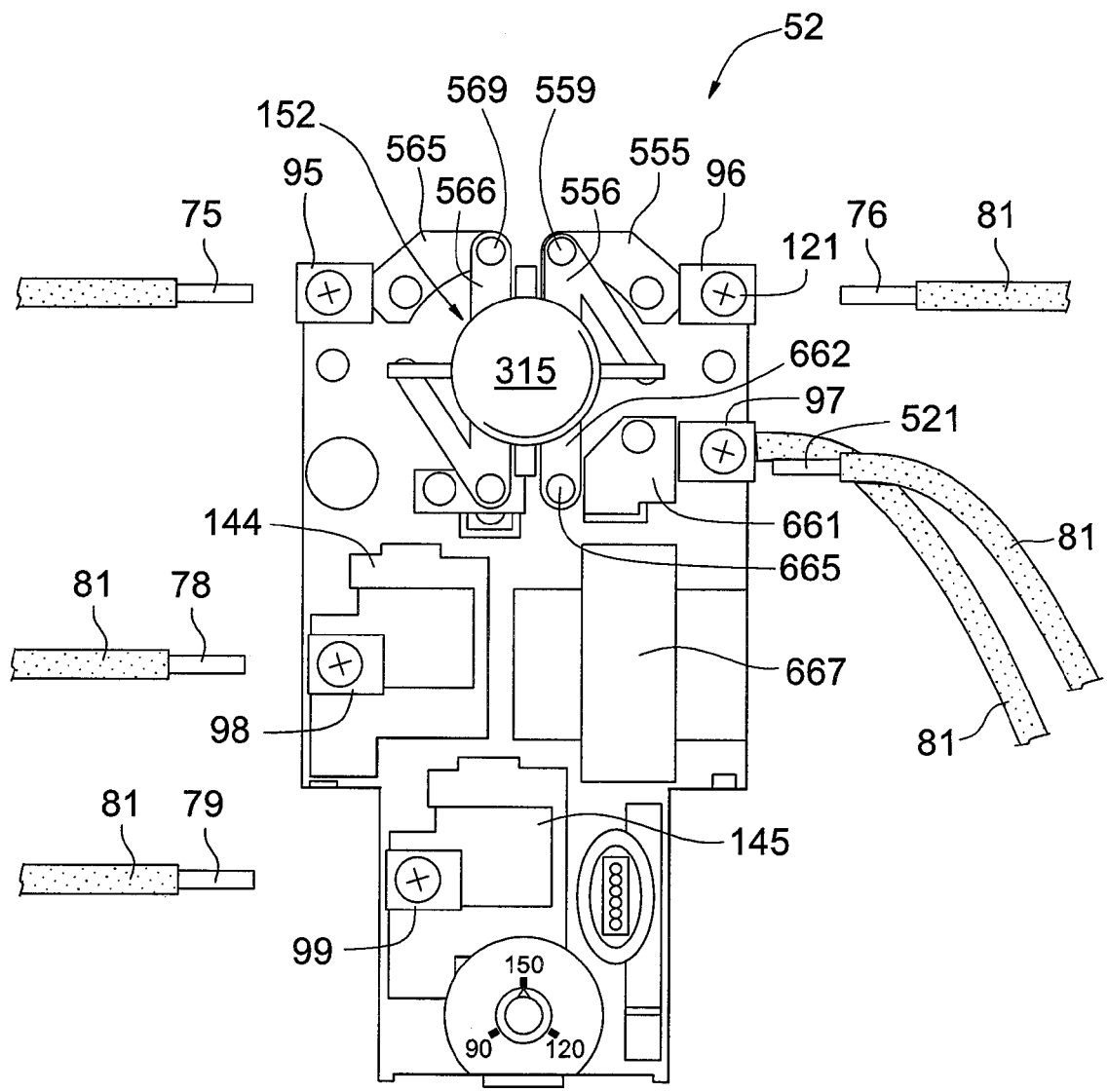
FIG. 17 depicts an exemplary water heater controller with its housing removed for illustrative purposes to expose internal components of the controller.
Figure 18:
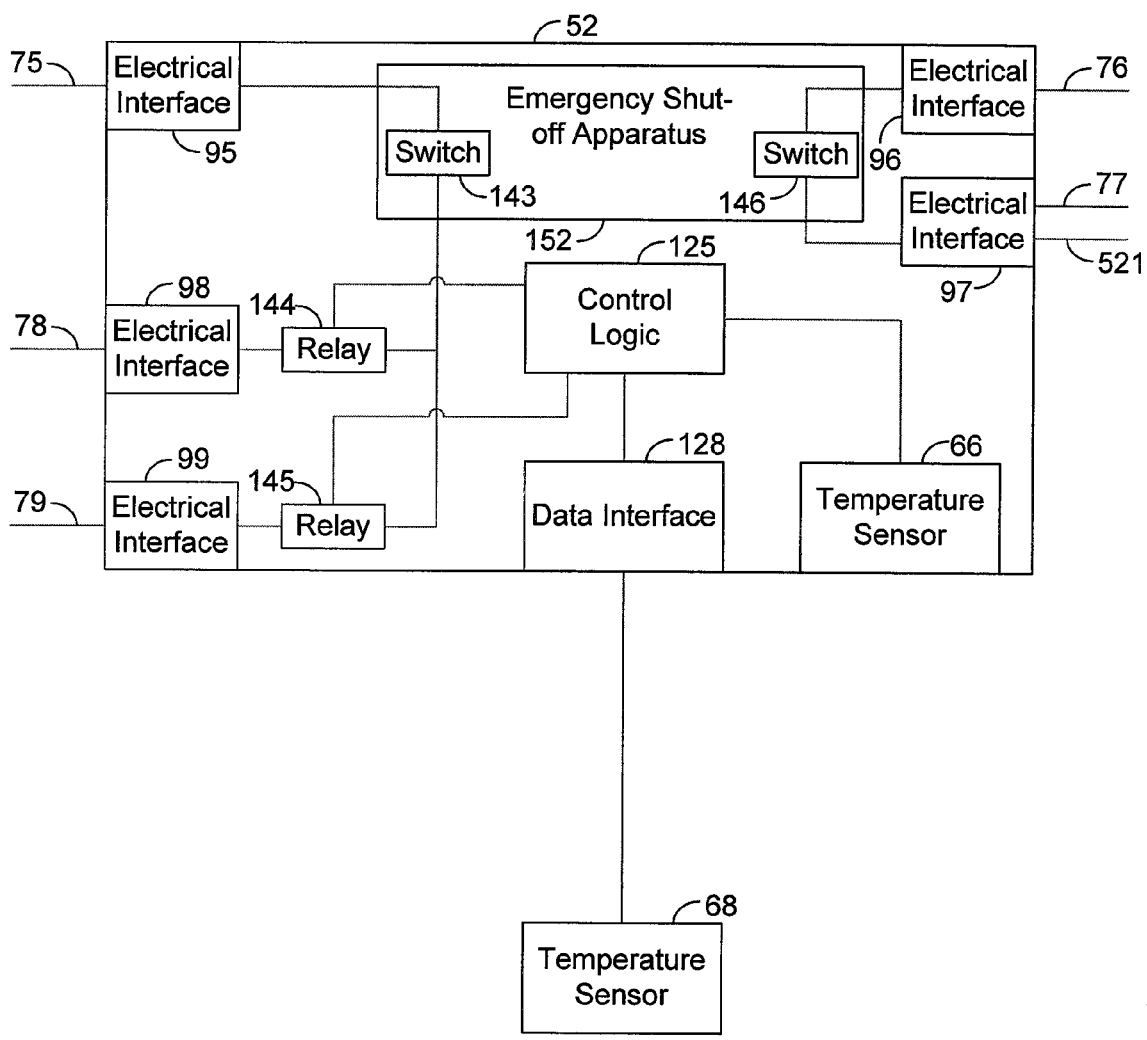
FIG. 18 is a block diagram illustrating an exemplary water heater controller, such as is depicted in FIG. 17.

FIG. 17 depicts an electronically actuated water heater controller 52 in accordance with one exemplary embodiment with the housing 84 removed for illustrative purposes. As shown by FIGS. 17 and 18, the electrical interface 97 is coupled to a conductive wire 521, in addition to wire 77. In this embodiment, the wire 77 is electrically coupled to one of the heating elements 55 or 56, and the wire 521 is electrically coupled to the other heating element. For example, the wire 77 may be electrically coupled to the upper heating element 55 and the relay 144 such that electricity passes through the wires 77 and 78, as well as heating element 55, when the control logic 125 places the relay 144 in a closed state. In such an example, the wire 521 may be coupled to the lower heating element 56 and the relay 145 such that electricity passes through the wires 79 and 521, as well as the lower heating element 56, when the control logic 125 places the relay 145 in a closed state.

In the embodiment shown by FIG. 17, each electrical interface 95-99 comprises a block of conductive material and shall be referred to hereafter as a "terminal block." However, other configurations of the interfaces 95-99 are possible in other embodiments. FIG. 17 depicts a transformer 667 that is used to transform the AC signal received from wires 75 and 76 to a lower voltage DC signal for use by various components of the controller 52, such as the control logic 125.

The terminal block 95 is electrically coupled to the emergency shut-off apparatus 152 via conductive connections 565 and 566, which are joined and pressed together by a conductive rivet 569 passing through both connections 565 and 566. Similarly, the terminal block 96 is electrically coupled to the emergency shut-off apparatus 152 via conductive connections 555 and 556, which are joined and pressed together by a conductive rivet 559 passing through both connections 555 and 556.

Figure 19:
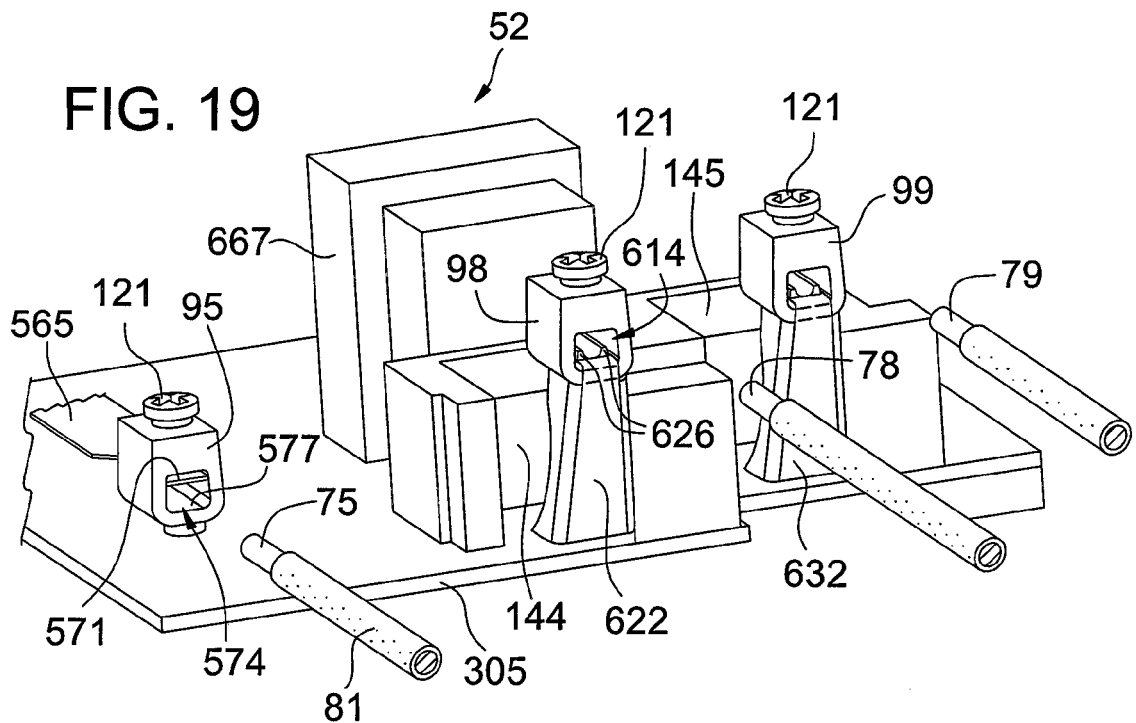
FIG. 19 depicts a three-dimensional perspective of the water heater controller depicted in FIG. 17.

As shown by FIG. 19, an end 571 of the connection 565 (FIG. 17) passes through a hole 574 in the terminal block 95. A top side of the connection end 571 that contacts a screw 121, as described in more detail below, is flat. Thus, the entire periphery of the screw rim 123 (FIG. 6) contacts the connection end 571 thereby helping to ensure that force is applied from the screw 121 to the connection end 571 in an even and predictable manner. However, in other embodiments, the top side of the connection end 571 can have other shapes, and it is unnecessary for the entire periphery of the screw rim 123 to contact the connection end 571 in all embodiments.

Figure 20:
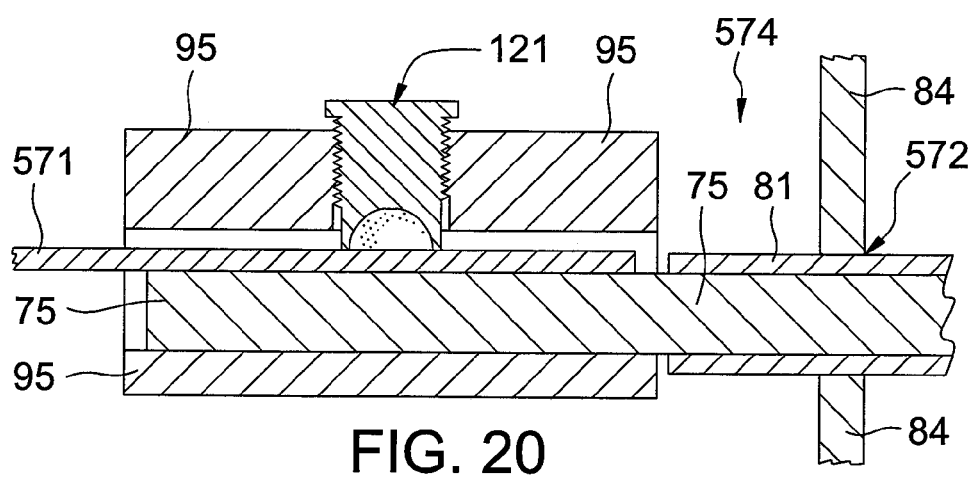
FIG. 20 depicts a cross-sectional view of an exemplary electrical interface for a water heater controller, such as is depicted in FIG. 19.

To connect the wire 75 to the terminal block 95, the wire 75 is inserted through the hole 574 such that the wire 75 is positioned between the connection end 571 and a floor 577 formed by the conductive terminal block 95, as shown by FIGS. 19 and 20. In the embodiment shown by FIG. 19, the floor 577 is flat, but other shapes for the floor 577 are possible in other embodiments. A coating 81 of electrically insulating material covers portions of the wire 75 outside of block 95.

Once the wire 75 is inserted into the hole 574 of the terminal block 95, the screw 121 is then rotated such that it is in contact with the end 571 and presses the end 571 against the wire 75 thereby decreasing contact resistance for the electrical current that is to flow between the wire 75 and the connection end 571. Generally, the tighter that the screw 121 is screwed against the connection end 571, the greater is the force that presses the connection end 571 against the wire 75 thereby decreasing contact resistance.

As shown by FIG. 20, the wire 75 and its coating 81 pass through a hole 572 in the housing 84. The hole 572 is preferably dimensioned such that it is just large enough for the wire 75 and its coating 81 to fit. Indeed, the housing wall defining the hole 572 preferably contacts the entire outer periphery of the coating 81 so that water cannot penetrate the housing 84 through the hole 572. Further, there is a gap 574 between the housing 84 and the terminal block 95. Such a gap 574 allows some of the coating 81 to pass into the housing 84 helping to ensure that any portion of the wire 75 exposed by the coating 81 is within the housing 84 and, therefore, unexposed to a user of the controller 52. Accordingly, water should be prevented from reaching the terminal block 95 or the tip of the wire 75 that is exposed by the coating 81, and a user should be prevented from inadvertently touching the wire 75. Similar techniques may be used to ensure that the tips of the other wires 76-79 and 521 not covered by a coating 81 are entirely within the housing 84 and, therefore, not exposed to a user of the controller 52. In such manner, water that may be splashed on the controller 52 can be prevented from reaching any of the current-carrying components of the controller 52 thereby obviating the need of a separate cover to shield the controller 52 in order to comply with safety requirements or satisfy safety concerns.

Figure 21:
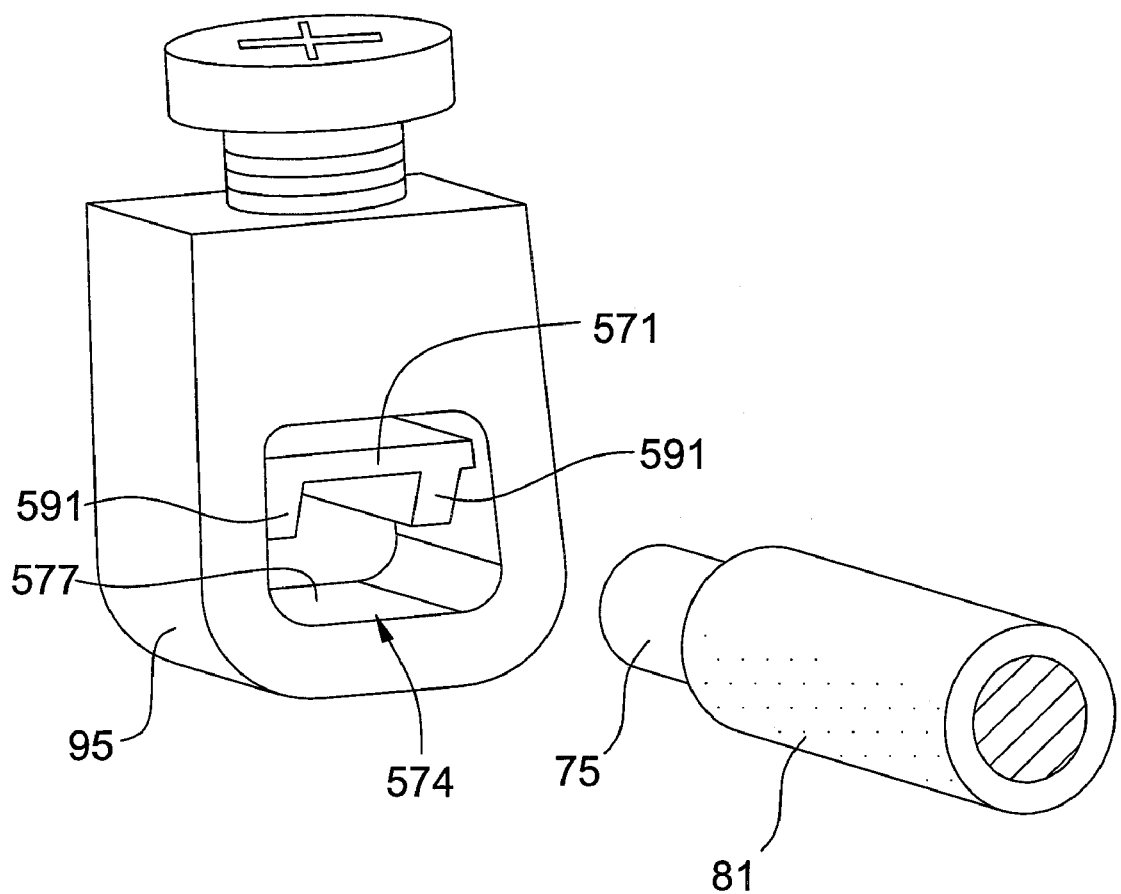
FIG. 21 depicts a three-dimensional perspective of an electrical interface depicted in FIG. 20.
Figure 22:
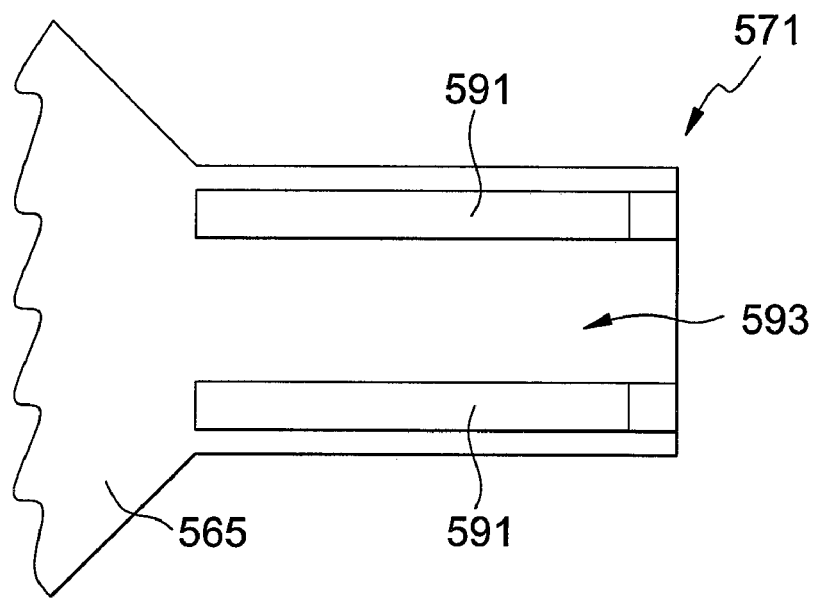
FIG. 22 depicts a bottom view of an exemplary connection end that is inserted into the electrical interface of FIG. 21.

As shown by FIGS. 21 and 22, a bottom side of the connection end 571 has a plurality of ribs 591 for guiding the wire 75 as it is being inserted into the hole 574 of the terminal block 95. In the instant embodiment, the connection end 571 has two ribs 591, but other numbers of ribs are possible in other embodiments. The ribs 591 are elongated and extend generally in a direction parallel to the direction of insertion for the wire 75. Further, various shapes for the ribs 591 are possible.

For example, if desired, sides of the ribs 591 may be tapered, and corners or other edges may be rounded. The wire 75 just fits within a channel 593 formed by the two ribs 591 shown in FIGS. 21 and 22. Moreover, the ribs 591 guide the wire 75 through the channel 593 thereby ensuring that the centerline 75 of the wire 75 is substantially aligned with the centerline of the screw 121. Having the wire 75 and screw 121 substantially aligned, as described above, generally helps to decrease contact resistance. In this regard, aligning the wire 75 and screw 121 generally helps to increase the pressure applied to the wire 75 by the connection end 571, thereby decreasing contact resistance. Ideally, the centerlines of the screw 121 and wire 75 intersect, but at least some degree of tolerance is acceptable without having a significant impact to contact resistance.

Figure 23:
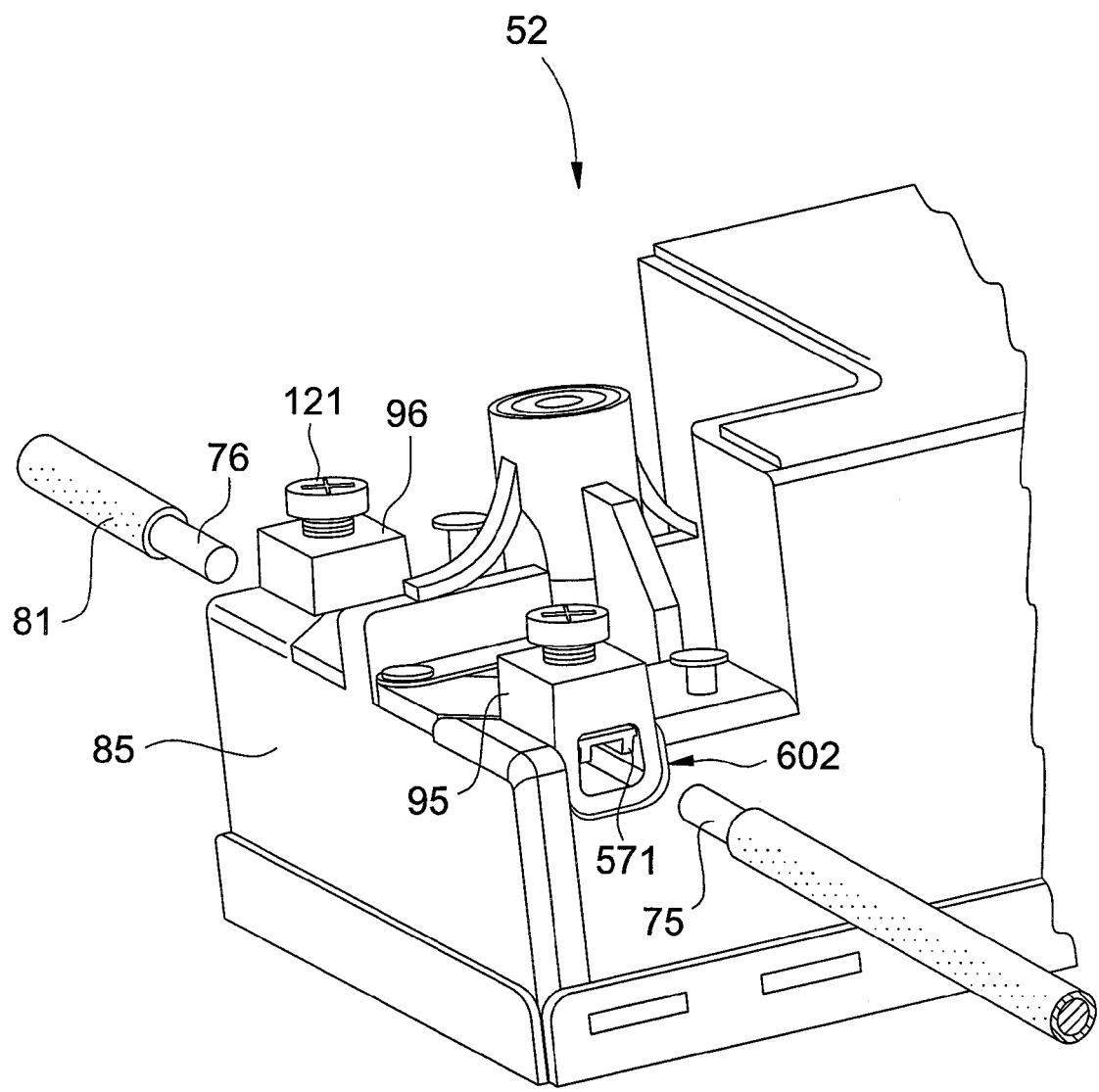
FIG. 23 depicts a three-dimensional perspective of the electrical interface of FIG. 21 with a section of the controller's housing shown for illustrative purposes.

FIG. 23 shows the controller 52 with the housing section 83 (FIG. 2) removed for illustrative purposes. As shown by FIG. 23, the terminal block 95 fits within a channel 602 formed by the housing section 85. However, other positions of the terminal block 95 are possible in other embodiments. In addition, the configuration of the terminal block 96 is identical to that of the terminal block 95, and the wire 76 may be connected to the terminal block 96 in the same manner that the wire 75 is connected to the terminal block 95. In this regard, an end of the connection 555 (FIG. 17) passes through a hole in the terminal block 96, and a screw 121 can be rotated to press such connection end against the wire 76, which is also inserted through the hole in the terminal block 96. Further, a bottom side of the end of the connection 555 is ribbed like the connection end 571 described above in order to guide the wire 76 as it is being inserted into the terminal block 96. However, other configurations of the terminal blocks 95 and 96, as well as other techniques for connecting the terminal blocks 95 and 96 to wires 75 and 76, respectively, are possible in other embodiments.

Figure 24:
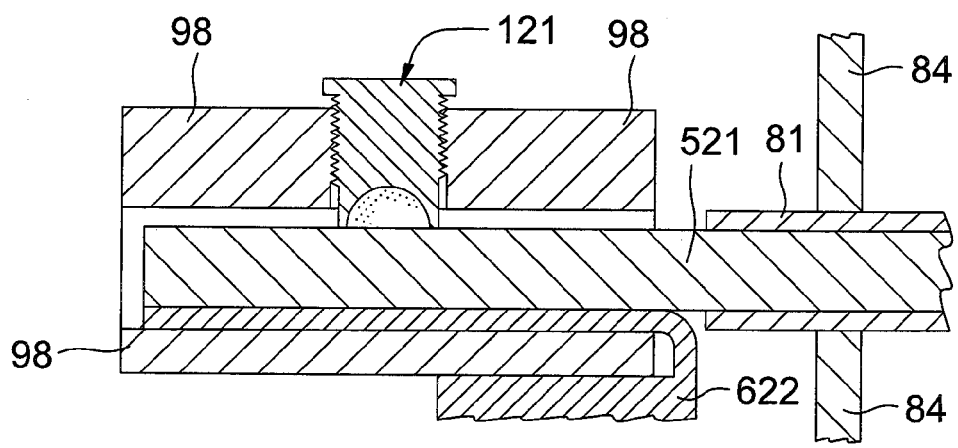
FIG. 24 depicts a cross-sectional view of an exemplary electrical interface for a water heater controller, such as is depicted in FIG. 19.

Referring to FIG. 19, the terminal block 98, like the terminal block 95 described above, has a hole 614 through which a wire 78 is inserted. Further, a conductive connection 622 electrically couples the terminal block 98 to the PCB 305. However, the connection 622 contacts the floor of the terminal block 98 within the hole 614 such that the wire 78 is positioned between the screw 121 and the connection 622 when the wire 78 is inserted into the terminal block 98, as shown by FIG. 24. The connection 622 has a plurality of ribs 626 for guiding the wire 78 as it is being inserted into the terminal block 98, similar to the ribs 591 (FIG. 24) that guide the wire 75. In this regard, the ribs 626 help to align the centerline of the wire 78 with the centerline of screw 121 such that a firm, reliable contact between the screw 121 and the wire 78 is ensured. Moreover, once the wire 78 is inserted through the hole 614, the screw 121 is preferably tightened such that it presses the wire 78 against the connection 622.

Figure 25:
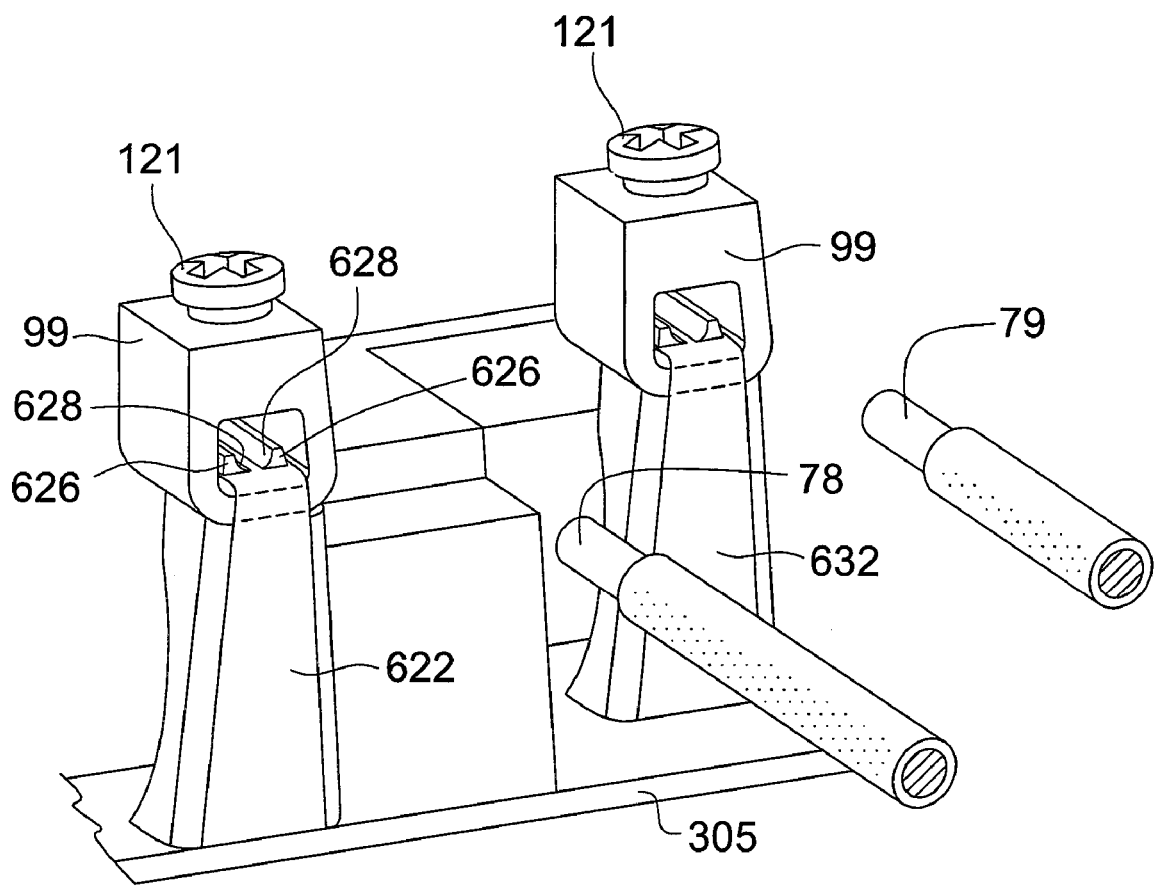
FIG. 25 depicts a three-dimensional perspective of the electrical interface depicted in FIG. 24.

As shown by FIG. 25, an inner wall 628 of each rib 626 is curved having a radius of curvature similar to that of the wire 78. Moreover, the wire 78 fits flush against the inner wall 628 of each rib 626 thereby enabling the wire 78 to be precisely aligned with the screw 121.

As shown by FIGS. 19 and 25, the terminal block 99 is electrically coupled to the PCB 305 via a conductive connection 632. The configuration of the terminal block 99 and connection 632 may be identical or similar to that of the terminal block 98 and connection 622, respectively. Thus, the wire 79 may be connected to the terminal block 99 in the same or similar manner that wire 78 is connected to the terminal block 98.

Figure 26:
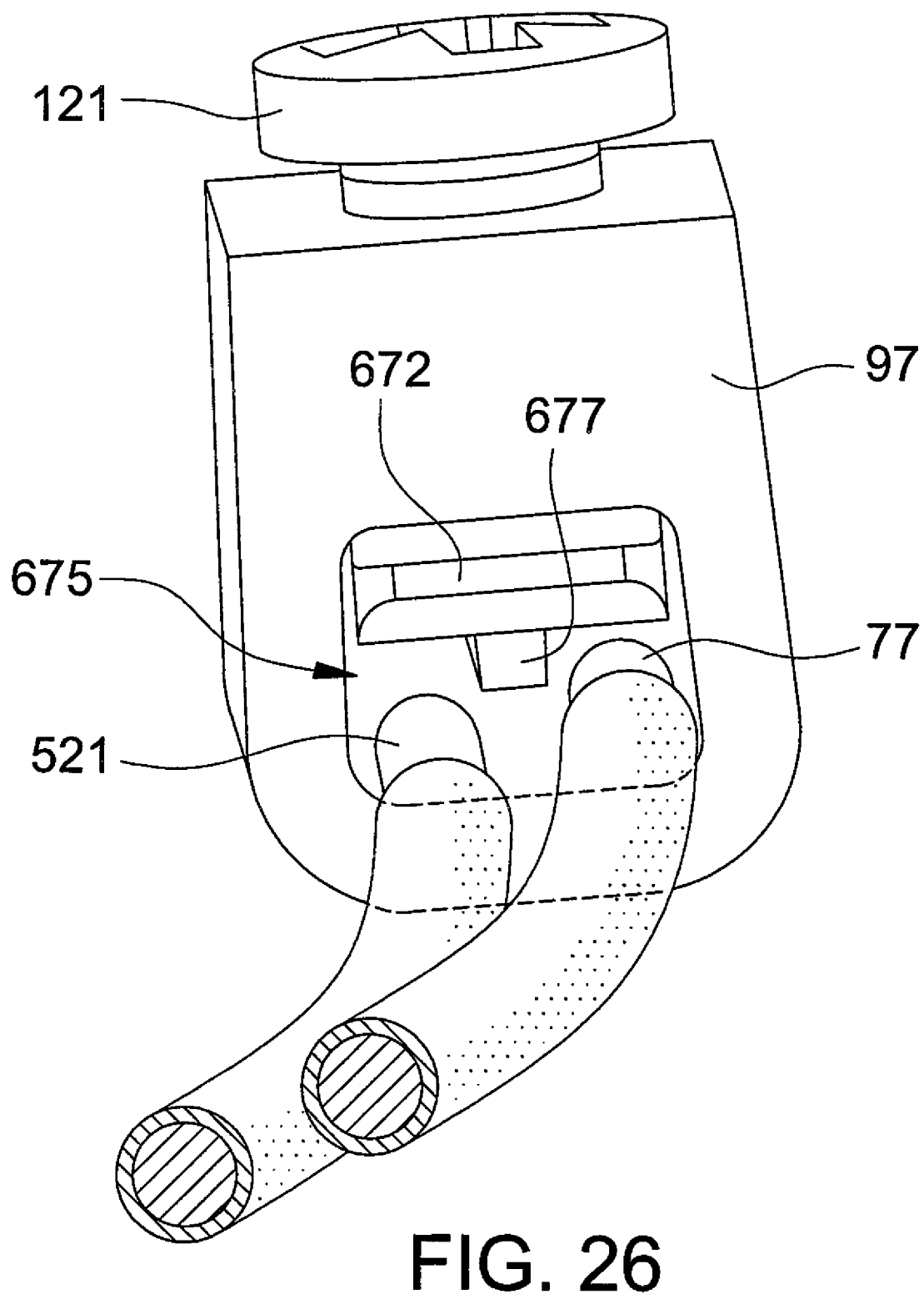
FIG. 26 depicts a side view of an exemplary electrical interface for a water heater controller, such as is depicted in FIG. 19.

As shown by FIG. 17, the terminal block 97 is electrically coupled to the emergency shut-off apparatus 152 via conductive connections 661 and 662, which are joined and pressed together by a conductive rivet 665 passing through both connections 661 and 662. As shown by FIG. 26, an end 672 of the connection 661 passes through a hole 675 in the terminal block 97. Further, the end 672 has a rib 677 on its lower surface. Like the ribs 591 of FIG. 22, the rib 677 is elongated and extends generally in a direction parallel to the direction of insertion of the wires 521 and 77. Further, various shapes of the rib 677 are possible. The rib 672 guides the wires 521 and 77 as these wires are being inserted through the hole 675. In this regard, each wire 521 and 77 is inserted into the hole 675 on an opposite side of the rib 677 relative to the other wire. Each wire 521 and 77 just fits between the rib 677 on one side and an inner wall of the terminal block 97 on the other side. The rib 677 helps to prevent the wires 521 and 77 from interfering with one another as they are inserted through the hole 675. Once the wires 521 and 77 are inserted into the hole 675, the screw 121 can be rotated such that it presses the connection end 672 against each of the wires 521 and 77 thereby forming a reliable electrical connection between the connection 661 (FIG. 17) and the wires 521 and 77.

Figure 27:
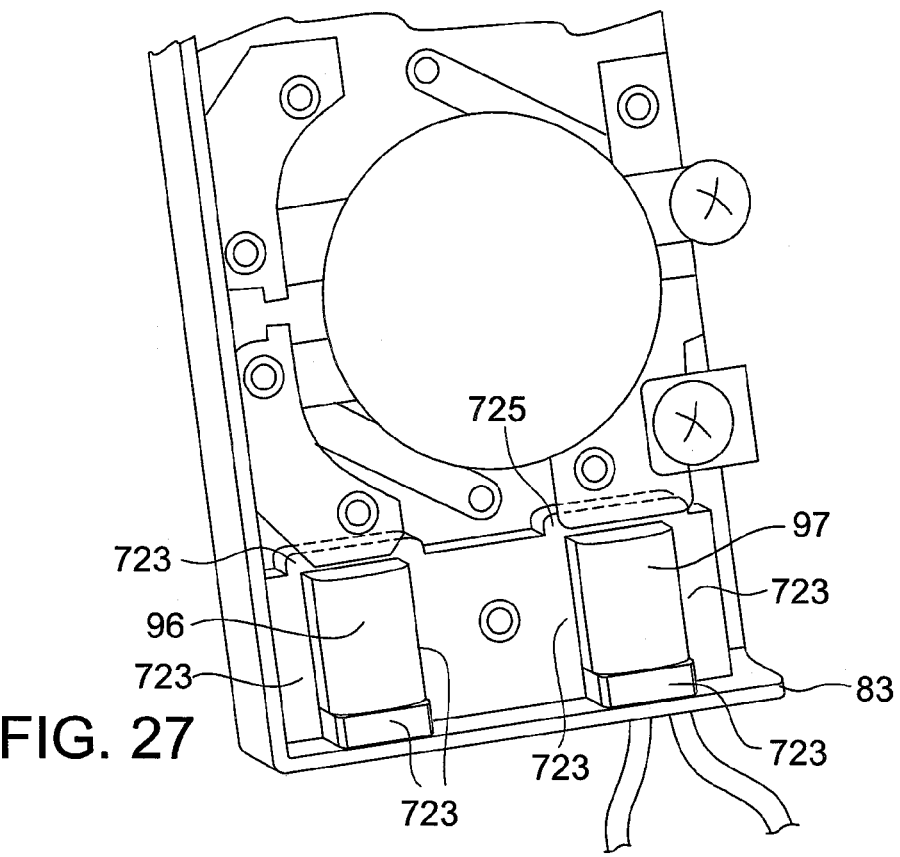
FIG. 27 depicts an exemplary housing section and various other components for a water heater controller, such as is depicted in FIG. 19.
Figure 28:
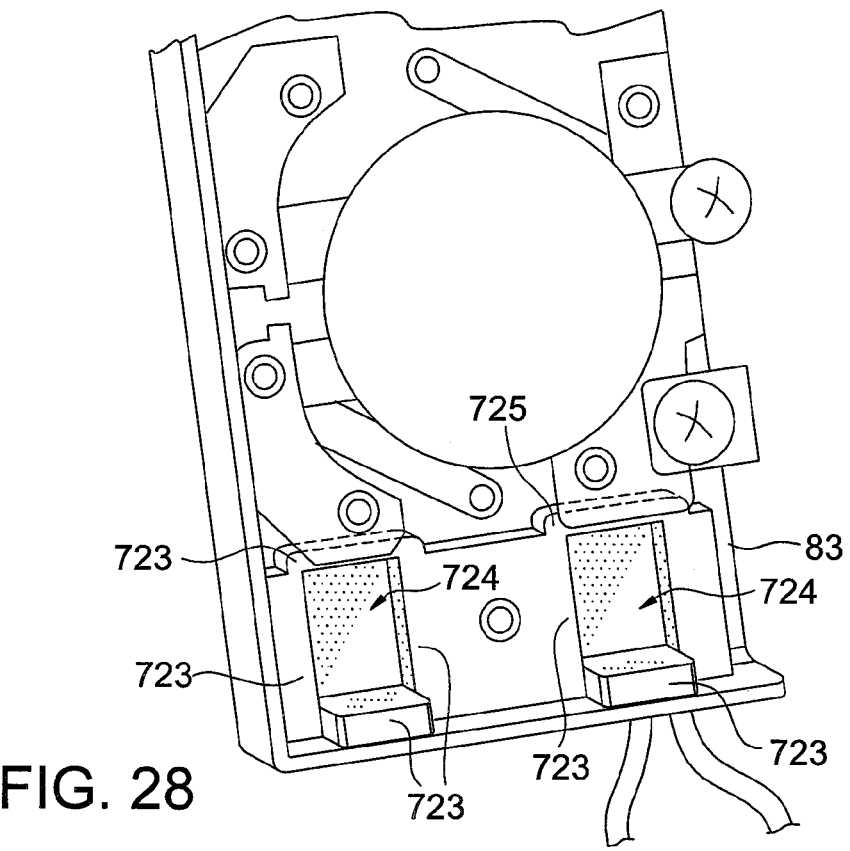
FIG. 28 depicts the housing section of FIG. 27 with electrical interfaces removed for illustrative purposes.

In one exemplary embodiment, the housing 84 forms guides that can help with assembly of the controller 52 during manufacture. For example, FIG. 27 depicts an interior of the housing section 83. The housing section 83 has a raised ridge 723 formed on its interior surface to help with positioning of the terminal blocks 96 and 97. In this regard, referring to FIGS. 27 and 28, the raised ridge 723 has a cavity 724 for each block 96 and 97, and each such block just fits in its respective cavity 724. In this regard, a periphery of each respective cavity 724 is similar to an outer periphery of the block 96 or 97 situated in it. Thus, by placing each block 96 and 97 within its respective cavity 724, it can be ensured that each block 96 and 97 is correctly positioned with a relatively high degree of precision. Further, the raised ridge 723 helps to keep the terminal blocks 96 and 97 in place once they have been positioned. In addition, other raised ridges formed by either of the housing sections 83 or 85 may similarly form cavities to help position other components correctly.

Figure 29:
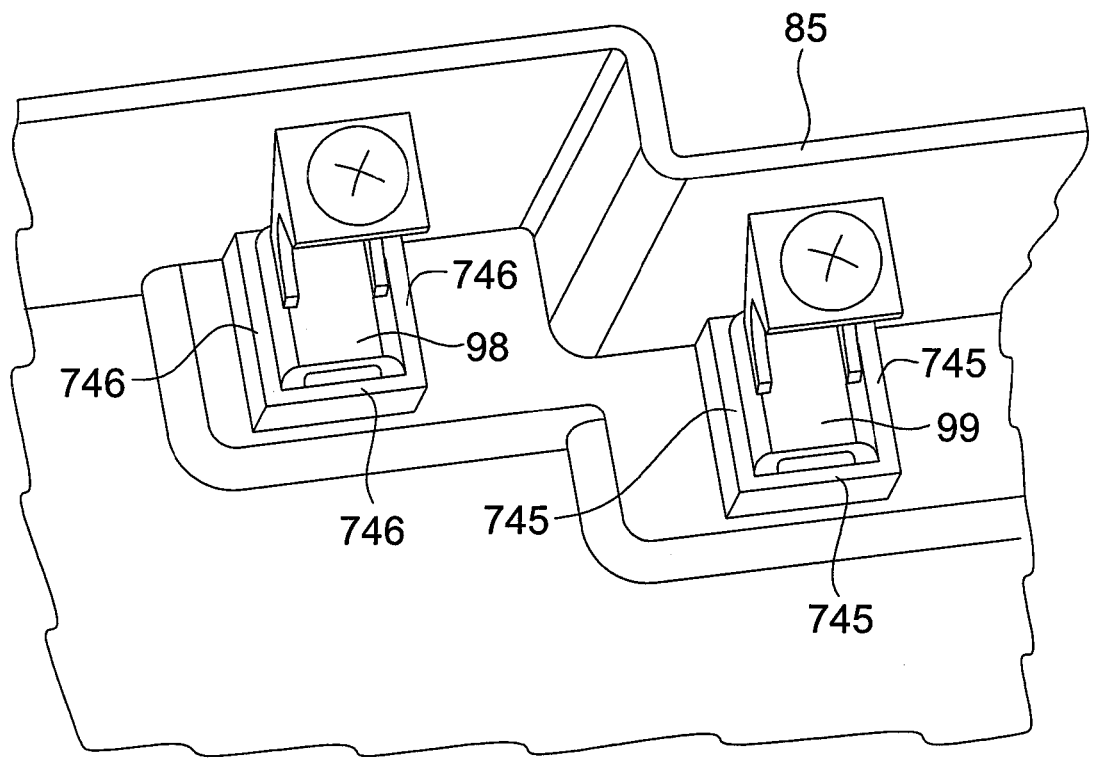
FIG. 29 depicts an exemplary housing section and various other components for a water heater controller, such as is depicted in FIG. 19.
Figure 30:
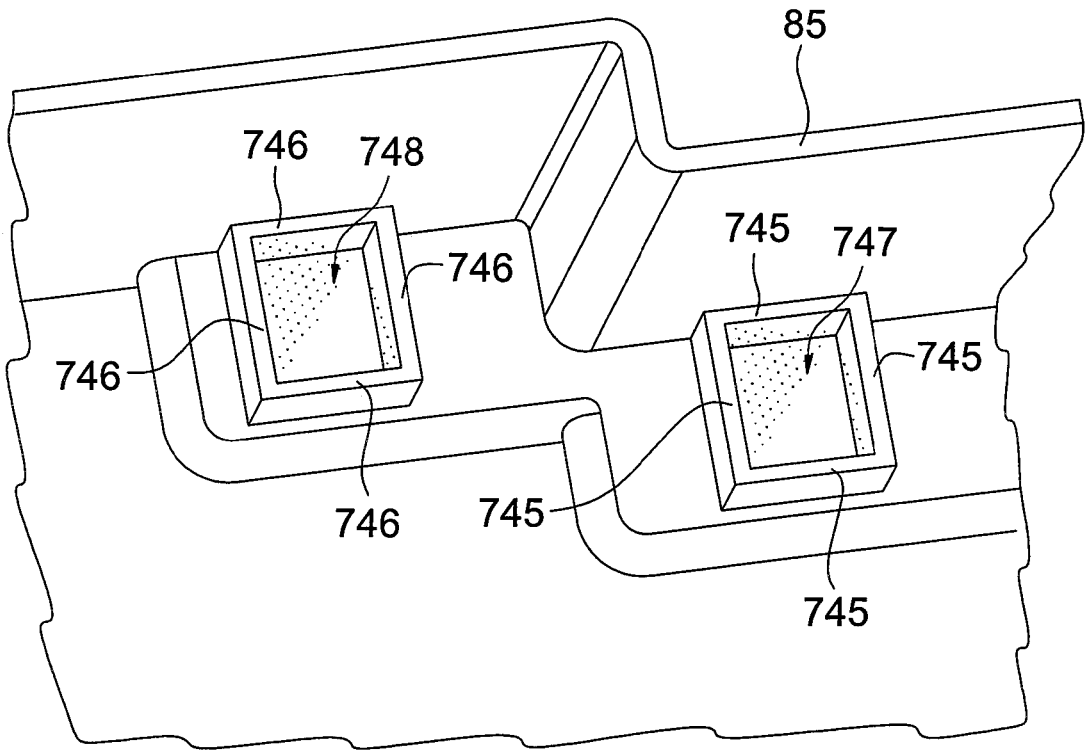
FIG. 30 depicts the housing section of FIG. 29 with electrical interfaces removed for illustrative purposes.

FIG. 29 depicts an interior portion of the housing 85 with the PCB 305 removed for illustrative purposes. As shown by FIGS. 29 and 30, a raised ridge 745 may be used to help position the terminal block 99 in a similar manner that the raised ridge 723 of FIG. 27 can be used to help position terminal blocks 96 and 97. In this regard, the ridge 745 forms a cavity 747 having a periphery similar in shape to an outer periphery of block 99. Further, a raised ridge 746 may be used to help position the terminal block 98 in a similar manner that the raised ridge 723 of FIG. 27 can be used to help position terminal blocks 96 and 97. In this regard, the ridge 746 forms a cavity 748 having a periphery similar in shape to an outer periphery of block 98.

The current-carrying components, such as terminal blocks 95-99 and connections 565, 566, 555, 556, as well as conductive connections on the PCB 305, can be composed of any conductive material, such as copper, bronze, brass, gold, etc. In one exemplary embodiment, each such current-carrying component is composed of a metallic alloy, such as K88 (C18080), which is a copper alloy having better stress relaxation properties relative to many other materials typically used for conductive connections. Moreover, heat can be an important issue, particularly when the controller 52 is sized to a small enough scale such that it can fit, as a drop-in replacement, for conventional mechanical controllers that are mounted via the brackets shown in FIGS. 11 and 12. Further, stress relaxation can be more pronounced in higher temperature environments, such as may be the case within the controller 52, and can increase the contact resistance of the current carrying components. Thus, in order to keep contact resistance at relatively low levels, thereby helping to reduce temperatures within the controller 52, material having the following properties is preferably used for the current carrying components: an International Annealed Copper Standard (IACS) of greater than approximately 80%, a yield stress greater than approximately 50 ksi (kilo-pounds per square inch), and a stress relaxation temperature greater than approximately 105 degrees Celsius. The copper alloy, K88 (C18080), satisfies such parameters, but other types of material may also satisfy the foregoing parameters and/or be used for the current-carrying components in other embodiments.

Figure 31:
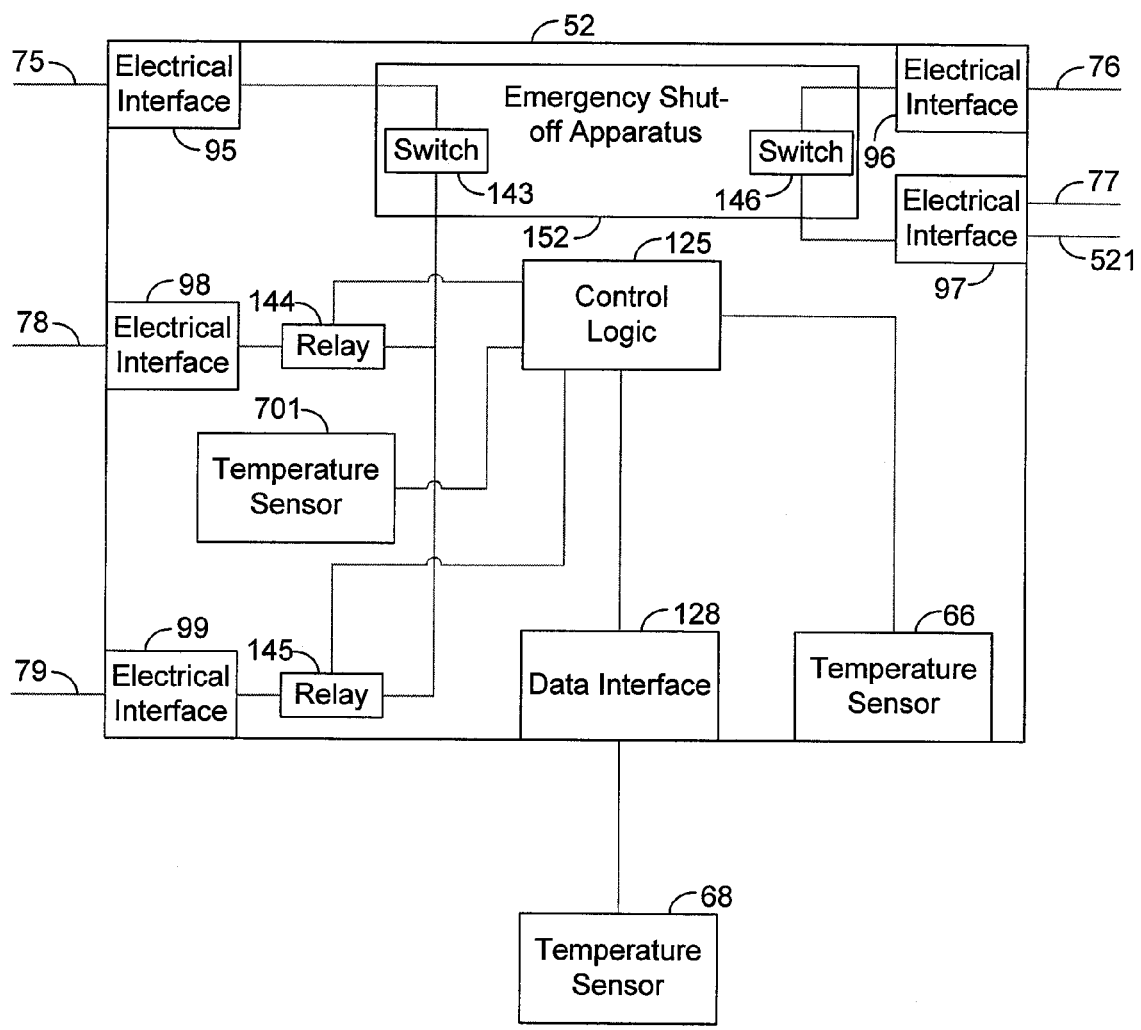
FIG. 31 is a block diagram illustrating an exemplary water heater controller, such as is depicted in FIG. 17.

In one exemplary embodiment, as depicted by FIG. 31, the controller 52 comprises at least one temperature sensor 701, such as a thermistor, in addition to the sensor 66. Such a sensor 701 is preferably positioned in close proximity to one or more of the high temperature components, such as the emergency shut-off apparatus 152, transformer 667, or relays 144 or 145. For example, the sensor 701 may be positioned on or close to one of the relays 144 or 145 and be used to detect failure or imminent failure of such relay, as described in U.S. patent application Ser. No. 11/117,068, entitled "System and Method for Detecting Failure of a Relay Based Circuit," and filed on Apr. 28, 2005, which is incorporated herein by reference. In one exemplary embodiment, the temperature sensor 701 is mounted on the PCB 305 and electrically coupled to the control logic 125.

If desired, the control logic 125, based on temperature data indicative of the temperatures sensed by the sensor 701, compensates the temperature data received from the sensor 66 in an effort to determine a more accurate temperature reading for comparison to the upper and/or lower set point of the upper heating element 55. For example, depending on the readings by the sensor 701, the control logic 125 may try to determine the extent to which heat from the apparatus 152, transformer 667, and/or relays 144 and/or 145 has affected a temperature reading from the sensor 66. The control logic 125 may then adjust the reading from the sensor 66 to account for the heating effects of the apparatus 152, transformer 667, and/or relays 144 and/or 145.

There are various methodologies that may be employed to compensate the temperature data from sensor 66 based on readings from the sensor 701. For example, in one embodiment, the controller 52 is tested for many different conditions to empirically determine the effect of the heat from at least one high temperature component to the reading from sensor 66. For example, during operation of the controller 52 or similar controller, readings from the temperature sensor 66 may be recorded by the control logic 125 or a test instrument that may be connected to the temperature sensor 66 for the purpose of conducting a test. Further, an additional temperature sensor (not shown), referred to a "test sensor" is coupled to the tank 53, and the temperature readings from the test sensor are simultaneously recorded with those from the sensor 66. Since the test sensor is not embedded in the controller 52, heat from the high temperature components of the controller 52 should not have a pronounced effect on the readings by the test sensor.

Moreover, the recorded readings of the test sensor and the temperature sensor 66 may then be analyzed to determine how heat from the high temperature components affected the readings of the temperature sensor 66. In this regard, it may be assumed that any difference between two simultaneous readings by the test sensor and the temperature sensor 66 is attributable to heat from the high temperature components. Thus, a determination can be made as to how the temperature readings of the temperature sensor 66, under various conditions, should be adjusted to account for heat from the high temperature components. The control logic 125 may then be configured to adjust the temperature readings from the sensor 66 accordingly.

Note that the adjustment applied to the readings from the sensor 66 may take into account other factors in addition to the readings from the temperature sensor 701. For example, the length of time that one or more heating elements 55 or 56 have been activated may be a factor. As a mere example, based on the test results, it may be determined that a reading from the temperature sensor 66 is usually about a particular number (e.g., two) degrees F. higher than a simultaneous reading from the test sensor when either element 55 or 56 has been activated for longer than a particular number (e.g., ninety) seconds if the reading from sensor 701 is above a particular temperature threshold (e.g., 150 F). In such an example, the control logic 125, during normal operation, may be configured to subtract two degrees F. from the temperature reading from the sensor 66 if the reading from the sensor 701 is above the temperature threshold and if either heating element 55 or 56 has been activated for longer than ninety seconds. It should be noted that the values and factors described in the foregoing example have been presented for illustrative purposes, and it should be apparent to one of ordinary skill in the art that other values and factors may be employed in other examples. Further, other techniques for testing the controller 52 and/or using the test results to compensate the temperature readings from the sensor 52 are possible. In addition, the temperature readings from the sensor 66 can be adjusted in different ways to compensate for the heat from one or more of the high temperature components based on at least one reading from the sensor 701.

Figure 32:
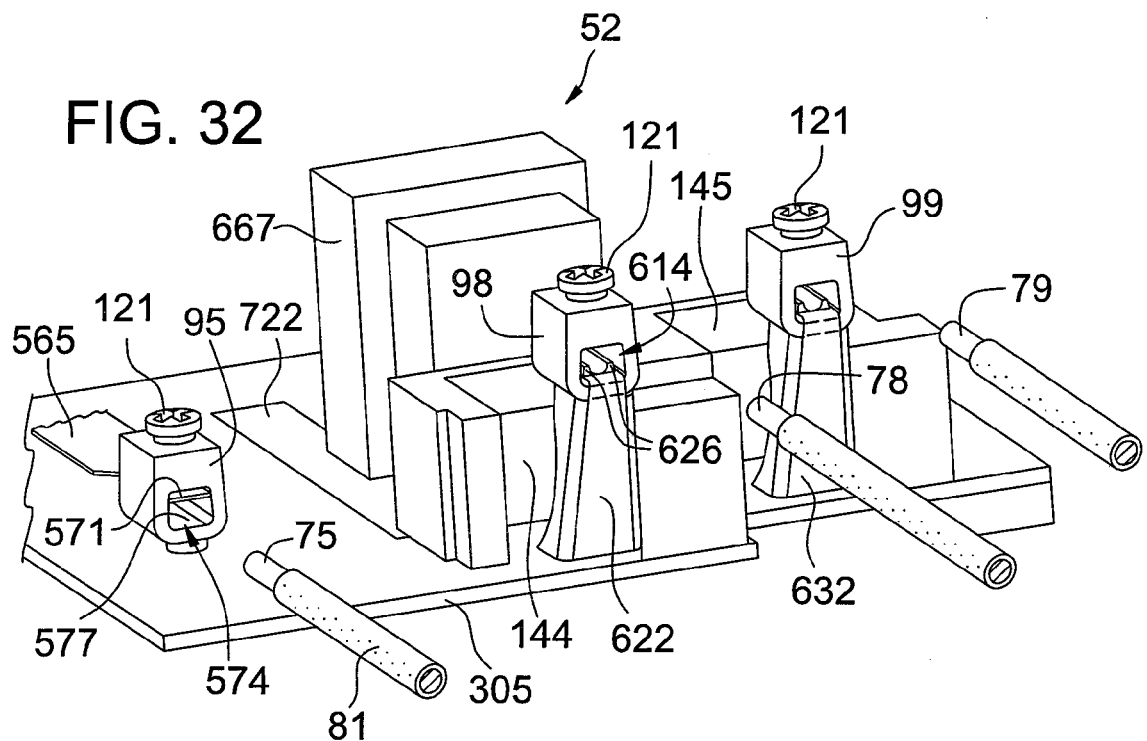
FIG. 32 is a three-dimensional perspective of an exemplary water heater controller having thermally conductive elements for heat sinking. The controller's housing and various other components have been removed for illustrative purposes.
Figure 33:
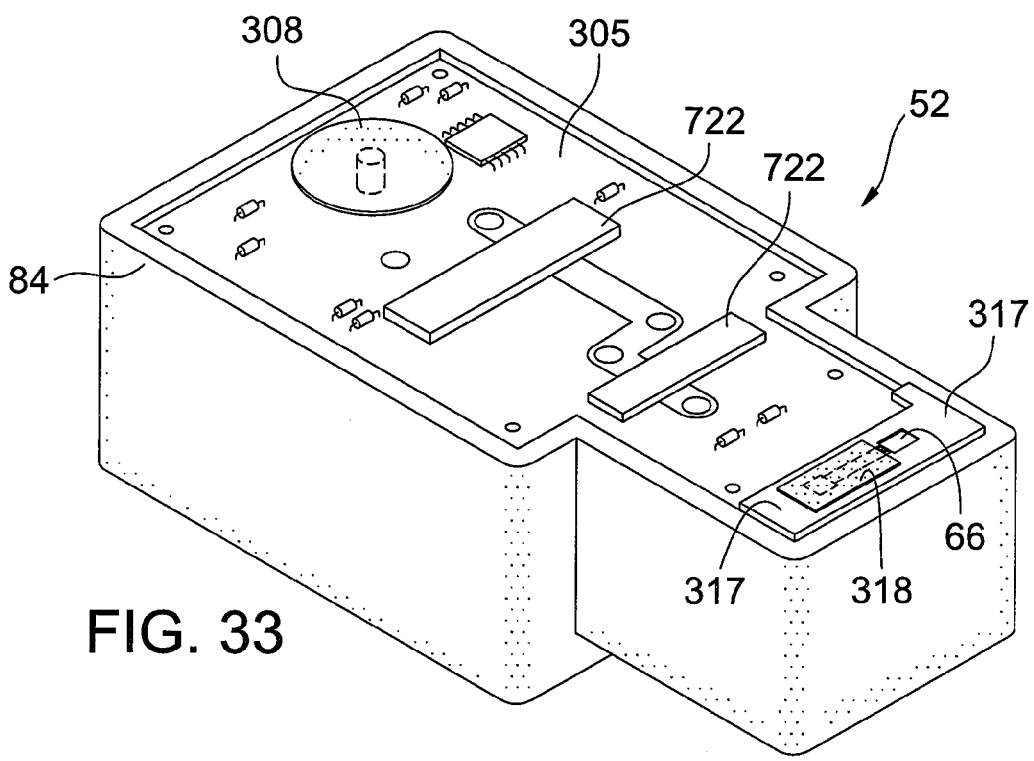
FIG. 33 depicts a three-dimensional back view of the water heater controller of FIG. 32 with its base removed, for illustrative purposes, to expose internal components of the controller.

In one exemplary embodiment, as depicted by FIG. 32, the controller 52 comprises at least one element 722 of thermally conductive material for helping to sink heat generated by various high temperature components, such as the apparatus 152, transformer 667, and/or relays 144 and 145, for example. In the embodiment depicted by FIG. 32, each such element 722 is mounted on the PCB 305 and passes through the PCB 302 to contact the base 166, as depicted by FIG. 33. FIG. 33 depicts two thermally conductive elements 722, but other numbers of such elements 722 may be used in other embodiments. Heat from at least one high temperature component passes through at least one thermally conductive element 722 to the base 166 (FIG. 10), which is in contact with the tank 53. Although the tank 53 may be at a high temperature, such as 150 degrees F. or more, it is likely that the tank's temperature is lower than the temperature within the controller 52. Thus, the tank 53 serves as a heat sink. To enhance the heat sinking, at least one of the thermally conductive elements 722 may directly contact one or more high temperature components, such as the apparatus 152, transformer 667, or a relay 144 or 145.

By configuring a water heater controller, as described herein, many of the heat related problems that plague electronically actuated controllers can be alleviated. In this regard, the exemplary designs of the electrical interfaces described above help to ensure reliable electrical connections with relatively low contact resistance, thereby helping to reduce temperatures within the controller. Temperatures can also be reduced by using a metallic alloy for the current-carrying components. Such metallic alloy preferably has good electrical conductivity and sufficient mechanical strength at high temperature to resist stress relaxation, which could otherwise lead to higher contact resistance over time as the controller operates in a high temperature environment.

Further, an emergency shut-off apparatus that is mechanically actuated, such as the one described in U.S. patent application Ser. No. 11/105,889, is likely to produce less heat as compared to one that is electronically actuated. Such a lower heat producing emergency shut-off apparatus can be used while at the same time allowing the heating elements to be electronically actuated during normal operation.

In addition, using a mechanically actuated emergency shut-off apparatus has an additional safety benefit in that the control of the emergency shut-off apparatus is separate from the control of the relays that are controlled based on comparisons of temperature readings to set points during normal operation. Indeed, applicable Underwriters Laboratories, Inc. (UL) standards in the United States require the control of the emergency shut-off apparatus be independent of the control of the switches that are used to activate and deactivate the heating elements during normal operation. To meet such UL requirement using an electronically actuated emergency shut-off apparatus would likely require additional circuitry that would produce at least some additional heat, as well as possibly increase the cost and overall size requirements of the controller to at least some extent.

Further, the temperature sensor is located at an end of the controller away from several components that produce a relatively high amount of heat, such as the emergency shut-off apparatus and the switches (e.g., relays) that control the activation states of the heating elements. In addition, the temperature sensor is located on a side of the PCB opposite to the foregoing components, helping to shield the temperature sensor from the heat produced by such components. Further, the temperature sensor is mounted on a separate strip of thermally insulating material to further shield the temperature sensor.

Moreover, by configuring a water heater controller in accordance with the exemplary embodiments of the present disclosure, the size of the water heater controller can be kept relatively small, such as similar to or smaller than the sizes of conventional water heater controllers that are mechanically actuated, yet exhibit a relatively high degree of reliability and ease of use. Further, such a water heater controller can be manufactured and installed at a relatively low cost.

Now, therefore, the following is claimed:

1. A water heater controller, comprising:
   a base composed of thermally conductive material;
   a housing composed of electrically insulating material, the housing coupled to the base;
   a power-source input;
   a relay configured to selectively convey power from the power-source input to a heating element;
   logic for controlling an operational state of the relay;
   a temperature sensor contacting the base and coupled to the logic; and
   an emergency shut off apparatus disposed within the housing and configured to disable the heating element independent of the logic and without disabling the logic by causing an open circuit condition between the power-source input and the heating element.

2. The controller of claim 1, wherein the temperature sensor is mounted on a component composed of thermally insulating material.

3. The controller of claim 1, further comprising a printed circuit board having a first side and a second side, the first side opposite of the second side, wherein the relay is mounted on the first side of the PCB, and wherein the temperature sensor is positioned between the PCB and the base on the second side of the PCB.

4. The controller of claim 3, wherein the temperature sensor is mounted on a component composed of thermally insulating material.

5. The controller of claim 3, wherein the controller is mounted on a tank via a bracket, the bracket having a notch, and wherein the temperature sensor is positioned in a portion of the controller inserted into the notch.

6. The controller of claim 3, wherein the emergency shut-off apparatus is mounted on the first side of the PCB.

7. The controller of claim 6, wherein the logic is mounted on the first side of the PCB.

8. The controller of claim 1, wherein the controller is mounted on a tank via a bracket, the bracket having a notch, and wherein the temperature sensor is positioned in a portion of the controller inserted into the notch.

9. The controller of claim 8, wherein the relay and the emergency shut-off apparatus are positioned in a portion of the controller outside of the notch.

10. A water heating system, comprising:
a tank;
a heating element; and
a controller coupled to the heating element, the controller comprising:
a base composed of thermally conductive material;
a housing composed of electrically insulating material, the housing coupled to the base;
a relay coupled to the heating element;
logic configured to control a state of the relay;
a temperature sensor contacting the base and coupled to the logic; and
an emergency shut-off apparatus disposed within the housing and configured to disable at least the heating elements independent of, and without disabling, the logic controlling the state of the relay.

11. The system of claim 10, wherein the temperature sensor is mounted on a component composed of thermally insulating material.

12. The system of claim 10, further comprising a printed circuit board having a first side and a second side, the first side opposite of the second side, wherein the relay is mounted on the first side of the PCB, and wherein the temperature sensor is positioned between the PCB and the base on the second side of the PCB.

13. The system of claim 12, wherein the temperature sensor is mounted on a component composed of thermally insulating material.

14. The system of claim 12, wherein the controller is mounted on a tank via a bracket, the bracket having a notch, and wherein the temperature sensor is positioned in a portion of the controller inserted into the notch.

15. The system of claim 12, wherein the logic is mounted on the first side of the PCB.

16. The system of claim 10, wherein the controller is mounted on a tank via a bracket, the bracket having a first arm and a second arm, and wherein the temperature sensor is positioned in a portion of the controller between the first and second arms.

17. The system of claim 16, wherein the relay is positioned in a portion of the controller that is outside of a notch formed by the first and second arms.

* * * * *